US011496855B2

(12) United States Patent
Yeon et al.

(10) Patent No.: US 11,496,855 B2
(45) Date of Patent: Nov. 8, 2022

(54) ELECTRONIC DEVICE AND GEOFENCE MANAGEMENT METHOD THEREOF

(71) Applicant: Samsung Electronics Co., Ltd., Gyeonggi-do (KR)

(72) Inventors: Jihyun Yeon, Gyeonggi-do (KR); Jinho Kim, Gyeonggi-do (KR); Sungwon Chung, Seoul (KR); San Cho, Gyeonggi-do (KR); Sunkey Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 16/651,044

(22) PCT Filed: Sep. 21, 2018

(86) PCT No.: PCT/KR2018/011226
§ 371 (c)(1),
(2) Date: Mar. 26, 2020

(87) PCT Pub. No.: WO2019/066401
PCT Pub. Date: Apr. 4, 2019

(65) Prior Publication Data
US 2020/0252742 A1 Aug. 6, 2020

(30) Foreign Application Priority Data
Sep. 29, 2017 (KR) .................. 10-2017-0127994

(51) Int. Cl.
*H04W 4/00* (2018.01)
*H04W 4/021* (2018.01)
(Continued)

(52) U.S. Cl.
CPC ............. *H04W 4/021* (2013.01); *G01S 19/25* (2013.01); *H04W 4/029* (2018.02); *H04W 4/38* (2018.02); *H04W 4/70* (2018.02)

(58) Field of Classification Search
CPC ....... H04W 4/02; H04W 64/00; H04W 4/029; H04W 4/021; H04W 4/025; H04L 67/22;
(Continued)

(56) References Cited

U.S. PATENT DOCUMENTS

| 8,396,485 B2 | 3/2013 | Grainger et al. |
| 9,609,479 B1 | 3/2017 | Bostick et al. |

(Continued)

FOREIGN PATENT DOCUMENTS

| EP | 2 744 234 A1 | 6/2014 |
| KR | 10-2015-0139170 A | 12/2015 |

OTHER PUBLICATIONS

Korean Search Report dated Aug. 19, 2021.
Notice of Patent Grant dated Feb. 24, 2022.

*Primary Examiner* — Omoniyi Obayanju
(74) *Attorney, Agent, or Firm* — Cha & Reiter, LLC

(57) ABSTRACT

Various embodiments of the present invention relate to an electronic device and a geofence management method thereof, the electronic device comprising: a wireless communication circuit for providing wireless communication by means of a low power wide area network (LPWAN); a location measuring circuit for detecting the location of the electronic device; a processor electrically connected to the wireless communication circuit and the location measuring circuit; and a memory electrically connected to the processor, wherein the memory may store instructions enabling, during execution, the processor to receive information on a plurality of geofences from an external server via the wireless communication circuit, determine whether the detected location is within two or more geofences, select one of the two or more geofences on the basis of at least a portion of the information, and transmit a message including the location and the selected geofence to the external server via the wireless communication circuit. Other various embodiments are possible.

12 Claims, 17 Drawing Sheets

(51) Int. Cl.
*H04W 4/38* (2018.01)
*H04W 4/70* (2018.01)
*H04W 4/029* (2018.01)
*G01S 19/25* (2010.01)

(58) Field of Classification Search
CPC .. H04L 51/20; G01S 5/0027; H04M 2242/30; H04M 2242/15
See application file for complete search history.

(56) References Cited

U.S. PATENT DOCUMENTS

| | | |
|---|---|---|
| 2008/0183485 A1 | 7/2008 | Drabble et al. |
| 2009/0286505 A1* | 11/2009 | Kirk .................... G08B 27/005 455/414.1 |
| 2011/0191052 A1* | 8/2011 | Lin ....................... G01C 25/00 702/94 |
| 2012/0008526 A1 | 1/2012 | Borghei |
| 2016/0242010 A1* | 8/2016 | Parulski ................. H04L 67/22 |
| 2017/0039636 A1* | 2/2017 | Khoshbin ............... H04W 4/02 |
| 2017/0171704 A1 | 6/2017 | Frenz |
| 2017/0280283 A1 | 9/2017 | Venkatraman et al. |

\* cited by examiner

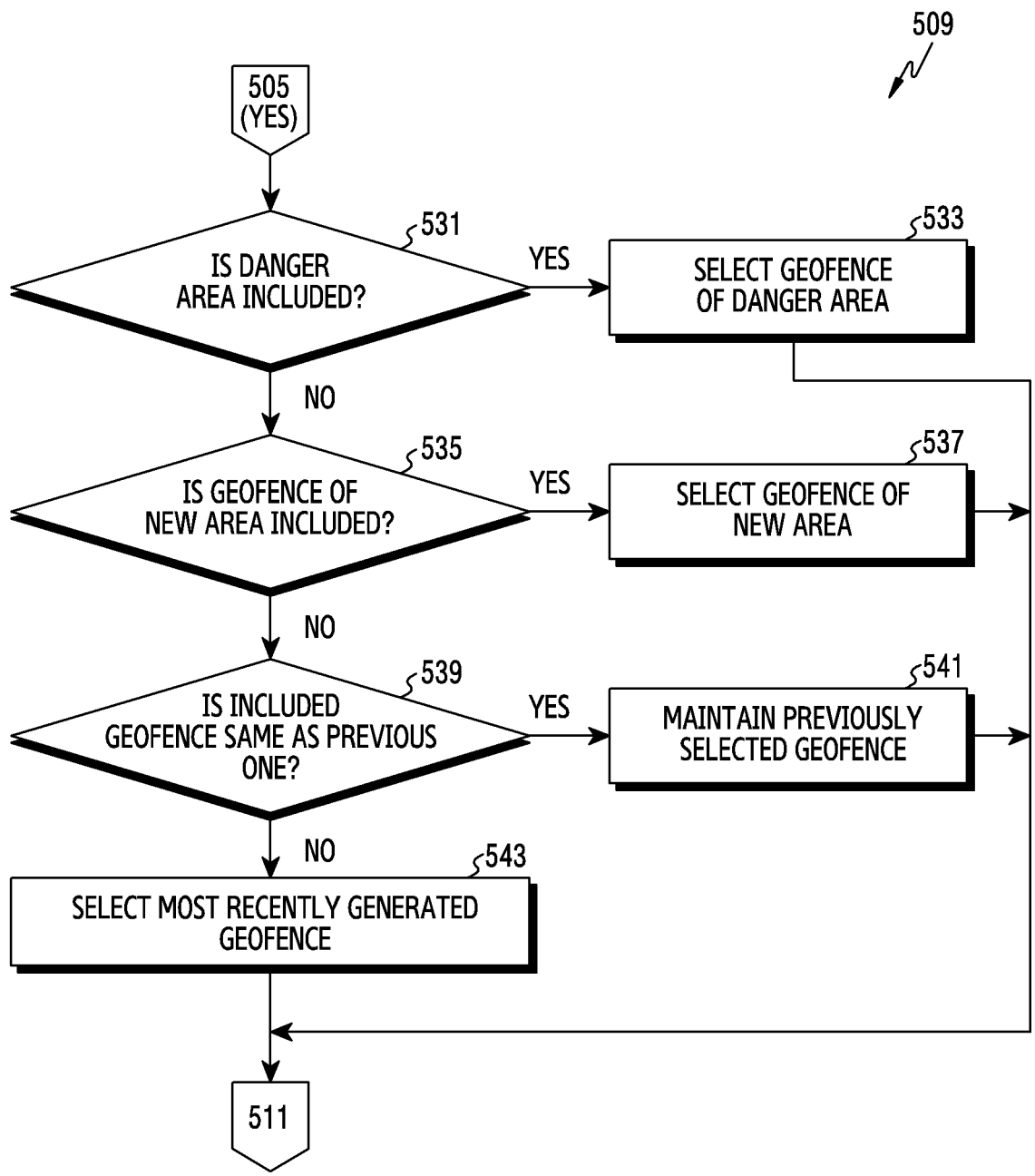

ELECTRONIC DEVICE AND GEOFENCE MANAGEMENT METHOD THEREOF

CLAIM OF PRIORITY

This application is a National Phase Entry of PCT International Application No. PCT/KR2018/011226, which was filed on Sep. 21, 2018 and claims a priority to Korean Patent Application No. 10-2017-0127994, which was filed on Sep. 29, 2017, the contents of which are incorporated herein by reference.

TECHNICAL FIELD

Various embodiments of the disclosure relate to an electronic device and a geofence management method thereof.

BACKGROUND ART

Electronic devices (for example, mobile terminals, smartphones, wearable electronic devices, or the like) may provide various functions. For example, a smartphone may provide short-range wireless communication (for example, Bluetooth, wireless fidelity (Wi-Fi), near field communication (NFC), or the like), mobile communication ($3^{rd}$ generation (3G), 4G, 5G, or the like), a music or video replay function, a capturing function, a navigation function, a messenger function, etc., in addition to a basic voice communication function.

Recently, position-based services using areas (for example, geofences) divided by virtual boundaries are actively used. The geofence refers to a virtual fence divided on a real geographic area, and may be manually generated by a user or may be automatically generated by using a designated district (for example, a school zone around an elementary school, or an administrative district of a specific area).

DISCLOSURE OF INVENTION

Technical Problem

A geofence may be set in a designated shape (for example, a circular or rectangular shape) in a specific area on a map. For example, the geofence may be set in a circular shape having a specific radius, and may have a radius of a minimum size (for example, 100 meters) or larger. Since the geofence has the designated shape, a desired area may not be exactly designated by the geofence. In addition, there are inconveniences that the electronic device may not set a geofence for an area smaller than the minimum size, and may not set the geofence in other shapes than the designated shapes.

A plurality of geofences may be set, and the plurality of geofences may overlap one another at least in part. When the electronic device is positioned in an overlapping area, the electronic device provides information of the plurality of geofences to a user. This may cause the user to feel that a precise service is not provided.

Various embodiments of the disclosure may select and provide one geofence according to a set rule when a plurality of geofences overlap one another.

Various embodiments of the disclosure may set a precise geofence area by generating a geofence of a new shape by using an overlapping area of at least two geofences.

Various embodiments of the disclosure may provide an alarm according entry to or exit from a geofence.

Various embodiments of the disclosure may change a position measurement interval according to an attribute of a geofence, a distance to a boundary, and/or a movement speed.

Solution to Problem

According to various embodiments of the disclosure, an electronic device includes: a wireless communication circuit configured to provide wireless communication by using a low power wide area network (LPWAN); a positioning circuit configured to detect a position of the electronic device; a processor electrically connected with the wireless communication circuit and the positioning circuit; and a memory electrically connected with the processor, and the memory stores instructions that, when being executed, cause the processor to: receive information regarding a plurality of geofences from an external server through the wireless communication circuit; determine whether the detected position exists within two or more geofences; select one of the two or more geofences based on at least part of the information; and transmit a message including the position and the selected geofence to the external server through the wireless communication circuit.

According to various embodiments of the disclosure, an electronic device includes a display, a wireless communication circuit configured to provide wireless communication, a processor electrically connected with the display and the wireless communication circuit, and a memory electrically connected with the processor, and the memory stores instructions that, when being executed, cause the processor to: display a map for setting a geofence on the display; detect a gesture input of moving along the map; and, in response to an input of a geofence setting command, generate a geofence corresponding to a route corresponding to the gesture input by overlapping at least two circular zones each other.

According to various embodiments, a geofence management method of an electronic device includes: receiving information regarding a plurality of geofences from an external server through a wireless communication circuit which provides wireless communication by using an LPWAN; detecting a position of the electronic device; when the detected position exists within two or more geofences, selecting one of the two or more geofences based on at least part of the information; and transmitting a message including the position and the selected geofence to the external server through the wireless communication circuit.

Advantageous Effects of Invention

Various embodiments of the disclosure may generate a geofence of a new shape by using overlapping areas of geofences, such that the geofence can be precisely set.

Various embodiments of the disclosure may select and provide a representative geofence according to a set rule when a plurality of geofences overlap one another.

Various embodiments of the disclosure may provide an alarm according to entry to or exit from a geofence, and may provide an alarm regarding an area where a plurality of geofences overlap one another, based on a representative geofence.

Various embodiments of the disclosure may change a position measurement interval according to importance of a geofence, and may determine a position measurement interval regarding an area where a plurality of geofences overlap one another based on a representative geofence.

BRIEF DESCRIPTION OF DRAWINGS

FIG. 5C is a sequence diagram illustrating a method for selecting a representative geofence of the electronic device according to an embodiment of the disclosure;

BEST MODE FOR CARRYING OUT THE INVENTION

Figure 1:
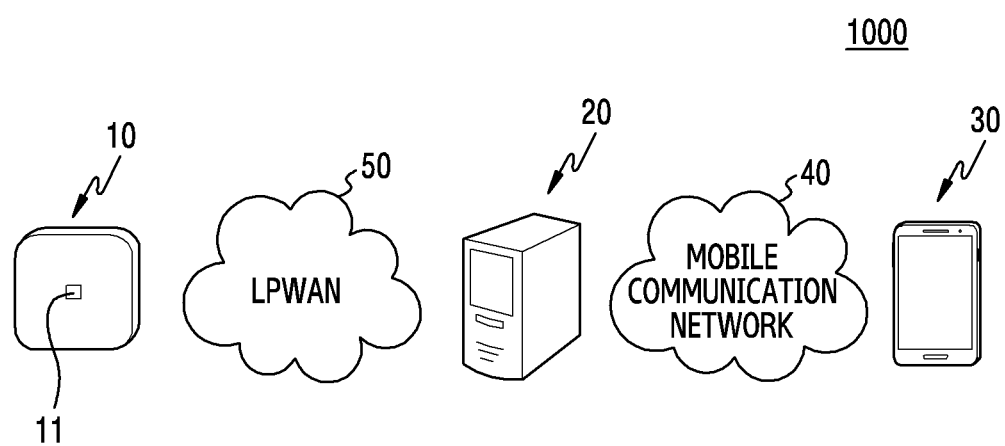
FIG. 1 is a view illustrating a geofence management system according to an embodiment of the disclosure.

Hereinafter, various embodiments of the disclosure will be described with reference to the accompanying drawings. In the disclosure, specific embodiments are illustrated in the drawings and relevant detailed descriptions are provided, but this is not intended to limit various embodiments of the disclosure to specific forms. For example, it is obvious to those skilled in the art to which the disclosure belongs that embodiments of the disclosure can be variously changed.

FIG. 1 is a view illustrating a geofence management system according to an embodiment of the disclosure.

Referring to FIG. 1, the geofence management system 1000 according to an embodiment of the disclosure may include a first electronic device 10, a server 20, and a second electronic device 30.

The first electronic device 10 according to an embodiment of the disclosure may be connected with the server 20 through a low power wide area network (LPWAN) 50. The LPWAN 50 may support low-speed communication with a thing that is at a long distance, has low power consumption, and has a small amount of data. For example, the LPWAN 50 may include a narrow band-internet of things (NB-IoT), LTE-M, LoRa, sigfox, extended coverage GSM for IoT (EC-GSM), or the like.

The NB-IoT may provide a service in a wide coverage (for example, about 15 km) at a low transmission rate (for example, about 100 kbps) by using a narrow band (for example, about 200 kHz) of a mobile communication network such as global system for mobile communication (GSM) or long term evolution (LTE). The LTE-M may provide a service in a coverage of about 11 km at a transmission rate of about 10 (or 5) Mbps by using a bandwidth of about 20 MHz. The LoRa may provide a service in a coverage of about 15 km (rural) or 5 km (urban) at a transmission rate of about 5 kbps by using a bandwidth of about 500 kHz. The sigfox may provide a service in a coverage of about 30 km (rural) or 10 km (urban) at a transmission rate of about 1 kbps by using a bandwidth of about 200 kHz.

The first electronic device 10 according to an embodiment of the disclosure may include electronic devices of various types which are capable of providing a position-based service. For example, the first electronic device 10 may be a positioning tracker which measures a position and provides the position to the server 20. When the first electronic device 10 receives a request of the second electronic device 30 at set intervals or through the server 20, the first electronic device 10 may measure a position and may transmit the position to the server 20. The set position measurement interval may be changed according to a situation. For example, the position measurement interval may be changed according to an attribute (for example, a degree of danger, a priority, etc.) of a corresponding area (for example, a geofence of a current position) and/or a distance to a boundary of the geofence. According to an embodiment, the first electronic device 10 may change a position measurement method according to the attribute of the geofence and/or the distance to the boundary of the geofence. This will be described in detail below with reference to FIG. 9.

The first electronic device 10 according to an embodiment of the disclosure may receive information (hereinafter, referred to as geofence information) on a specific area (hereinafter, referred to as a geo-fence) set on a map from the server 20, and may provide information on a geofence that a user enters (or leaves) (for example, a geofence name) to the server 20. When a current position is included in a plurality of geofences, the first electronic device 10 may select one of the plurality of geofences based on a set rule (for example, a priority, a danger area, a movement direction, etc.), and may provide the selected geofence as representative geofence information. This will be described in detail below with reference to FIGS. 5A to 5C.

The first electronic device 10 according to an embodiment of the disclosure may provide an alarm regarding entry to or exit from a geofence to the server 20. For example, when the first electronic device 10 enters (or leaves) a danger area or moves to a periphery of the danger area, the first electronic device 10 may provide an alarm to the server 20. According to an embodiment, the first electronic device 10 may provide an alarm regarding entry to or exit from a geofence. For example, the first electronic device may cause a light emitting device 11 (for example, a light emitting diode (LED)) disposed on one side of a housing thereof to emit light according to a designated rule (for example, to flicker at regular intervals or to emit light of a specific color). According to another embodiment, the first electronic device 10 may provide the alarm through sense of hearing (for example, a sound) or touch (for example, vibration). This will be described in detail below with reference to FIG. 8.

The server 20 according to an embodiment of the disclosure may be wirelessly connected with the first electronic device 10 and the second electronic device 30. For example, the server 20 may be connected with the first electronic device 10 through the LPWAN 50, and may be connected with the second electronic device 30 through a mobile communication network 40. The mobile communication network 40 may include a cellular network such as $3^{rd}$ generation (3G), 4G, 5G, or the like. According to a certain embodiment, the server 20 may be connected with the second electronic device through various wired or wireless communications such as wired Internet or Wi-Fi.

The server 20 according to an embodiment of the disclosure may receive information (hereinafter, referred to as geofence information) regarding a geofence set by a user of the second electronic device 30 from the second electronic device 30, and may store the information, and may deliver (or transmit) the same to the first electronic device 10. According to a certain embodiment, the server 40 may receive geofence information from an external server (or a geofence service server run by a country or a service provider), and may store the information.

The server 20 according to an embodiment of the disclosure may periodically receive position information from the first electronic device 10 and store the position information, and may deliver (or transmit) the same to the second electronic device 30. According to a certain embodiment, the server 20 may receive position information (or stored position information) from the first electronic device 10 upon receiving a request of the second electronic device 30, and may deliver the position information to the second electronic device 30.

The server 20 according to an embodiment of the disclosure may receive, from the first electronic device 10, position information, information of a geofence that the first electronic device 10 enters (or leaves) (for example, a representative name), and/or alarm information regarding entry (or exit). The server 20 may deliver the position information, the geofence information, and/or the alarm information to the second electronic device 30. According to a certain embodiment, the server 20 may request and receive the position information, and/or the geofence information from the first electronic device 10 upon receiving a request of the second electronic device 30, and may provide the received information to the second electronic device 30.

The second electronic device 30 according to an embodiment of the disclosure may be connected with the server 20 through the mobile communication network 40. This is merely an example and does not limit embodiments of the disclosure. For example, the server 20 and the second electronic device 30 may be connected with each other through various wired or wireless communications, such as wired Internet or Wi-Fi.

The second electronic device 30 according to an embodiment of the disclosure may include electronic devices of various types, for example, a portable electronic device such as a smartphone, a tablet personal computer (PC), a notebook PC, a wearable device, or the like, and a non-portable electronic device such as an IPTV, a desktop PC, or the like.

The second electronic device 30 according to an embodiment of the disclosure may receive position information of the first electronic device 10, information of a geofence that the first electronic device 10 enters or leaves, and/or alarm information through the server 20. According to a certain embodiment, the second electronic device may request position information of the first electronic device 10 and/or geofence information from the server 20 in response to a user input.

The second electronic device 30 according to an embodiment of the disclosure may generate a geofence according to a user input. The geofence may be generated to have a designated size of a set shape (for example, a circular shape). According to a certain embodiment, the geofence may be generated by overlapping at least two geofences. The second electronic device 30 may set an attribute of the generated geofence according to the user input or may set an attribute of the generated geofence by using position information or area information. The attribute of the geofence may be related to whether a corresponding area is dangerous (or safe). According to a certain embodiment, the second electronic device 30 may set a priority of the geofence. Information regarding the generated geofence (for example, coordinates (for example, latitude and longitude) of a reference point, a radius, an attribute (for example, a danger area, a safety area), priority information, etc.) may be transmitted to the first electronic device 10 through the server 20. A method for generating the geofence information will be described in detail below with reference to FIGS. 6A to 7.

Figure 2:
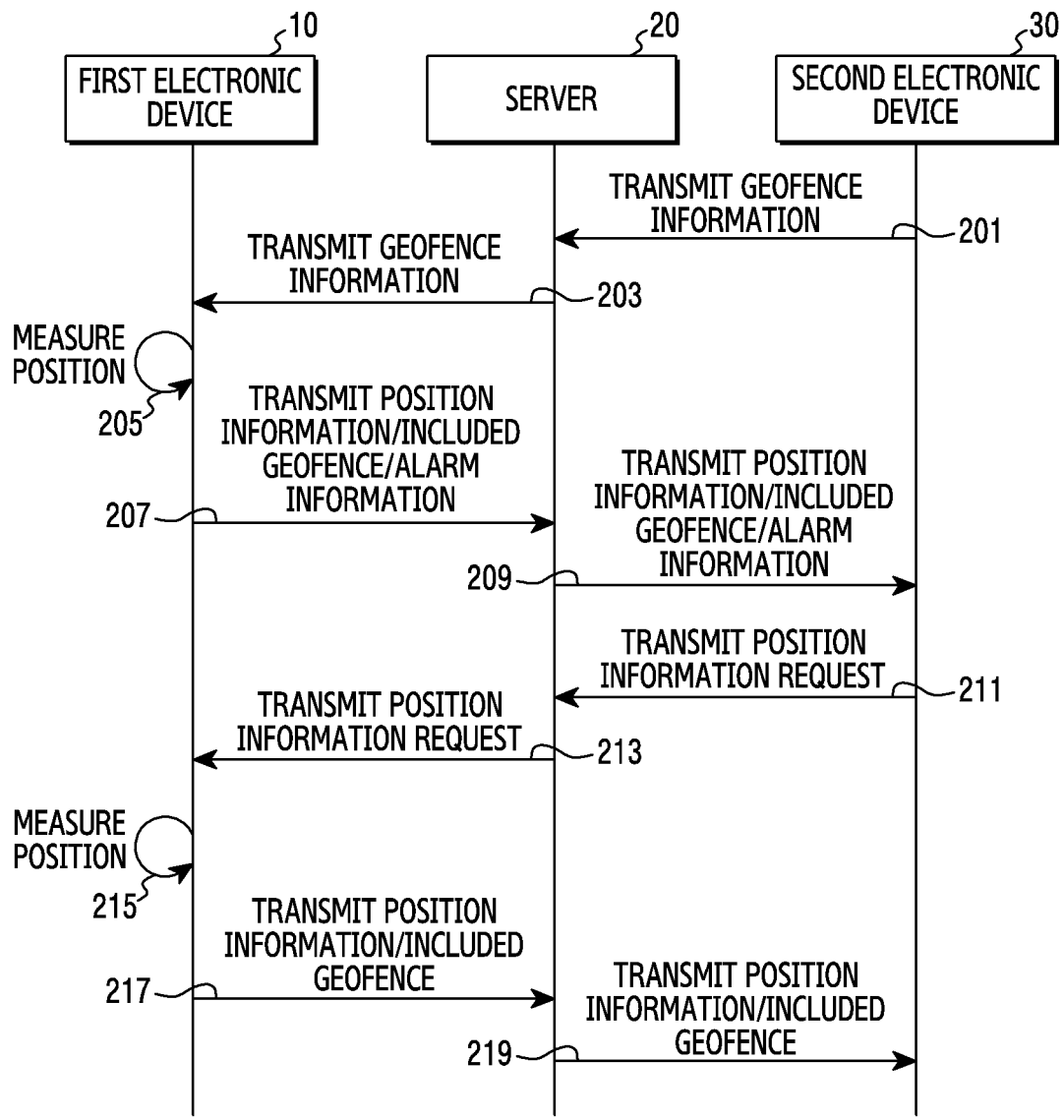
FIG. 2 is a flowchart illustrating operations of the geofence management system according to an embodiment of the disclosure.

FIG. 2 is a flowchart illustrating operations of the geofence management system according to an embodiment of the disclosure.

Referring to FIG. 2, in operation 201, the second electronic device 30 according to an embodiment of the disclosure may transmit geofence information to the server 20. The geofence information may include coordinates (for example, latitude and longitude) of a reference point, a radius, an attribute (for example, a danger area, a safety area, etc.), priority information, etc. A method for generating a geofence of the second electronic device 30 will be described in detail below with reference to FIGS. 6A to 6C.

In operation 203, the server 20 according to an embodiment of the disclosure may transmit the geofence information to the first electronic device 10. According to a certain embodiment, the server 20 may transmit, to the first electronic device 10, geofence information received from an external server providing a geofence service, in addition to the geofence information received from the second electronic device 30.

In operation 205, the first electronic device 10 according to an embodiment of the disclosure may measure a position. For example, the first electronic device 10 may measure the position at set measurement intervals. The measurement interval may be set according to setting of the user or setting of the server 20, or may be changed according to entry to a geofence area, a size of the geofence, an attribute (for example, a degree of danger) of the geofence area, and/or a shortest distance to a boundary of the geofence area.

In operation 207, the first electronic device 10 according to an embodiment of the disclosure may transmit, to the server 20, position information, a geofence including the first electronic device 10 (for example, a name of a geofence corresponding to the position information), and/or alarm information regarding entry to or exit from the geofence area. According to a certain embodiment, when the first electronic device 10 is included in a plurality of geofences, the first electronic device 10 may select a representative geofence according to a set rule, and may transmit information (for example, a name) of the selected geofence to the server 20. The set rule may include a priority, a degree of danger, and/or a movement direction. For example, when the position information is included in a danger area and a non-danger area, the first electronic device 10 may select a danger area of a high priority (or a high degree of danger) as a representative geofence, and may transmit geofence information regarding the danger area to the server 20. According to a certain embodiment, when the first electronic device 10 moves from a danger area (a first geofence) to an area where the danger area (first geofence) and a non-danger area (second geofence) overlap each other, based on previous position information, the first electronic device 10 may select the non-danger area (second geofence) as a representative geofence, and may transmit geofence information regarding the non-danger area (second geofence) to the server 20. The transmitting operation may be performed when there is a high possibility that the first electronic device 10 moves to the non-danger area through a movement route.

In operation 209, the server 20 according to an embodiment of the disclosure may transmit the received position information, the geofence including the first electronic device, and/or the alarm information to the second electronic device 30.

In operation 211, the second electronic device 30 according to an embodiment of the disclosure may request position information. For example, the second electronic device 30 may transmit a message requesting the position information of the first electronic device 10 to the server 20 when a position-based service application is executed or when the user requests after the application is executed.

In operation 213, the server 20 according to an embodiment of the disclosure may deliver the position information request to the first electronic device 10.

In operation 215, the first electronic device 10 according to an embodiment of the disclosure may measure a position in response to the request. According to a certain embodiment, the first electronic device 10 may extract previous position information stored when there is no movement after the position is measured.

In operation 217, the first electronic device 10 according to an embodiment of the disclosure may transmit, to the server 20, the measured position information, and/or geofence information related to the position information.

In operation 219, the server 20 according to an embodiment of the disclosure may deliver the received position information and/or the geofence information related to the position information to the second electronic device 30.

As described above, the first electronic device 10 according to various embodiments of the disclosure may transmit the position information, the geofence (or representative geofence) information and/or the alarm information to the second electronic device 30 through the server 20 at set intervals or upon receiving a request.

FIG. 3 is a block diagram illustrating an electronic device 301 in a network environment 300 according to various embodiments. Referring to FIG. 3, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). According to an embodiment, the electronic device 301 may communicate with the electronic device 304 via the server 308. According to an embodiment, the electronic device 301 may include a processor 320, memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, or an antenna module 397. In some embodiments, at least one (e.g., the display device 360 or the camera module 380) of the components may be omitted from the electronic device 301, or one or more other components may be added in the electronic device 301. In some embodiments, some of the components may be implemented as single integrated circuitry. For example, the sensor module 376 (e.g., a fingerprint sensor, an iris sensor, or an illuminance sensor) may be implemented as embedded in the display device 360 (e.g., a display).

The processor 320 may execute, for example, software (e.g., a program 340) to control at least one other component (e.g., a hardware or software component) of the electronic device 301 coupled with the processor 320, and may perform various data processing or computation. According to one embodiment, as at least part of the data processing or computation, the processor 320 may load a command or data received from another component (e.g., the sensor module 376 or the communication module 390) in volatile memory 332, process the command or the data stored in the volatile memory 332, and store resulting data in non-volatile memory 334. According to an embodiment, the processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323. The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input device 350 may receive a command or data to be used by other component (e.g., the processor 320) of the electronic device 301, from the outside (e.g., a user) of the electronic device 301. The input device 350 may include, for example, a microphone, a mouse, or a keyboard.

The sound output device 355 may output sound signals to the outside of the electronic device 301. The sound output device 355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 360 may visually provide information to a user of the electronic device 301. The display device 360 may include, for example, a display, a hologram device, or a projector and control circuitry to control a corresponding one of the display, hologram device, and projector. According to an embodiment, the display device 360 may include touch circuitry, or a pressure sensor adapted to measure the intensity of force incurred by the touch.

The audio module 370 may convert a sound into an electrical signal and vice versa. According to an embodiment, the audio module 370 may obtain the sound via the input device 350, or output the sound via the sound output device 355 or a headphone of an external electronic device (e.g., an electronic device 302) directly (e.g., wiredly) or wirelessly coupled with the electronic device 301.

The sensor module 376 may generate an electrical signal or data value corresponding to an operational state (e.g., power or temperature) of the electronic device 301 or an environmental state external to the electronic device 301. The sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support a specified protocol for coupling with the external electronic device (e.g., the electronic device 302) wiredly or wirelessly. According to an embodiment, the interface 377 may include a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, a HDMI connector, a USB connector, a SD card connector, or an audio connector (e.g., a headphone connector), The haptic module 379 may convert an electrical signal into a mechanical stimulus (e.g., a vibration or a movement) or electrical stimulus which may be recognized by a user via his tactile sensation or kinesthetic sensation. The haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to one embodiment, the power management module 388 may be implemented as at least part of, for example, a power management integrated circuit (PMIC).

The battery 389 may supply power to at least one component of the electronic device 301. The battery 389 may include, for example, a primary cell which is not rechargeable, a secondary cell which is rechargeable, or a fuel cell.

The communication module 390 may support establishing a wired communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a wired communication or a wireless communication. According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or infrared data association (IrDA)) or the second network 399 (e.g., a long-range communication network, such as a cellular network, the Internet, or a computer network (e.g., LAN or wide area network (WAN)). These various types of communication modules may be implemented as a single chip, or may be implemented as multi chips separate from each other.

The wireless communication module 392 may identify and authenticate the electronic device 301 in a communication network using subscriber information stored in the subscriber identification module 396.

The antenna module 397 may include one or more antennas to transmit or receive a signal or power to or from the outside. According to an embodiment, the communication module 390 (e.g., the wireless communication module 392) may transmit or receive the signal to or from the external electronic device through an antenna appropriate for a communication scheme.

Some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the electronic devices 302 and 304 may be a device of a same type as, or a different type, from the electronic device 301. According to an embodiment, all or some of operations to be executed at the electronic device 301 may be executed at one or more of the external electronic devices. According to an embodiment, if the electronic device 301 should perform a function or a service automatically, or by a request, the electronic device 301, instead of, or in addition to, executing the function or the service, may request at least part associated with the function or the service to external electronic devices. The external electronic devices receiving the request may perform the function requested, or an additional function, and transfer an outcome of the performing to the electronic device 301. The electronic device 301 may provide the outcome, with or without further processing of the outcome. To that end, a cloud computing, distributed computing, or client-server computing technology may be used, for example.

Figure 3A:
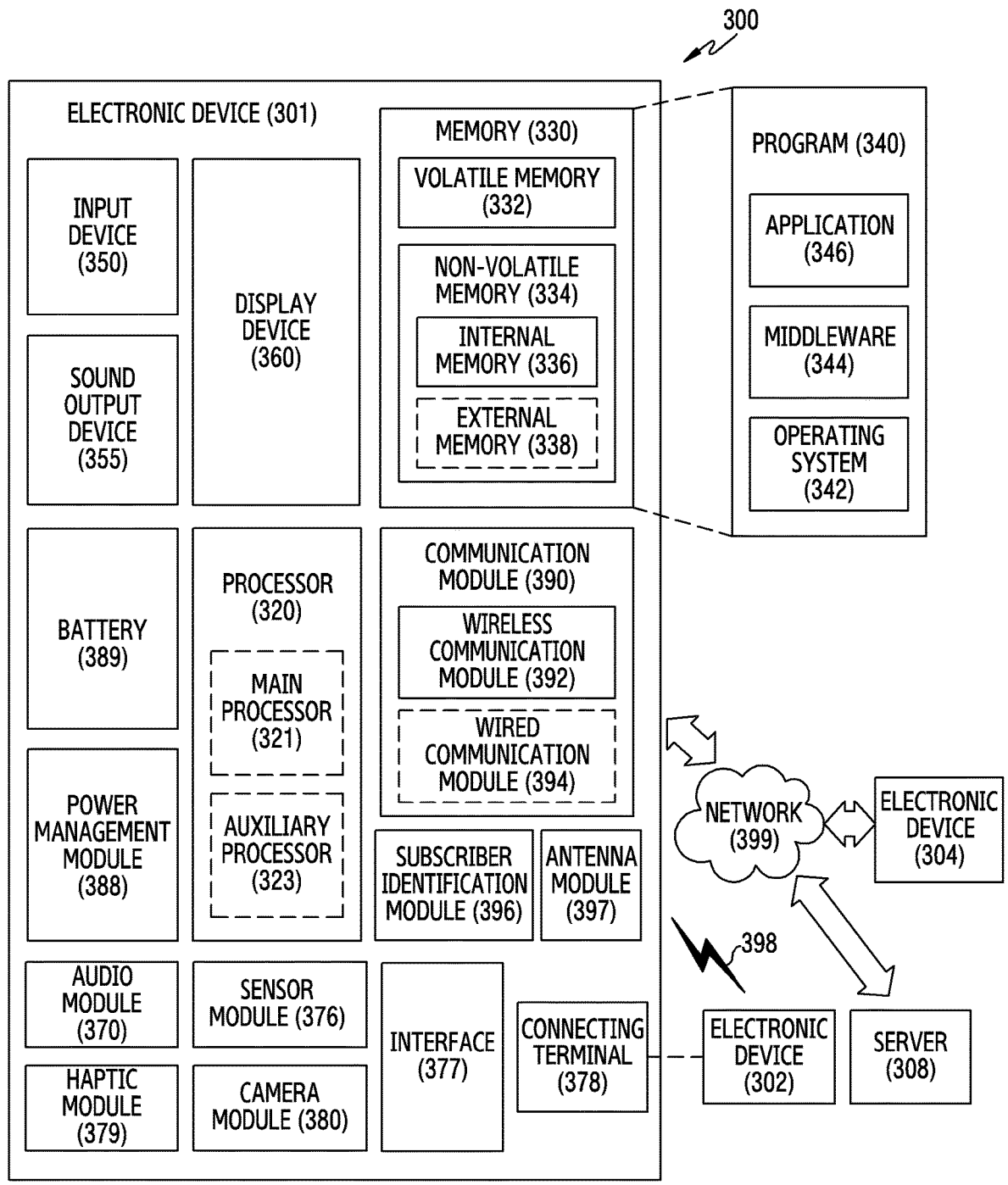
FIG. 3A is a block diagram of an electronic device in a network environment according to various embodiments.
Figure 3B:
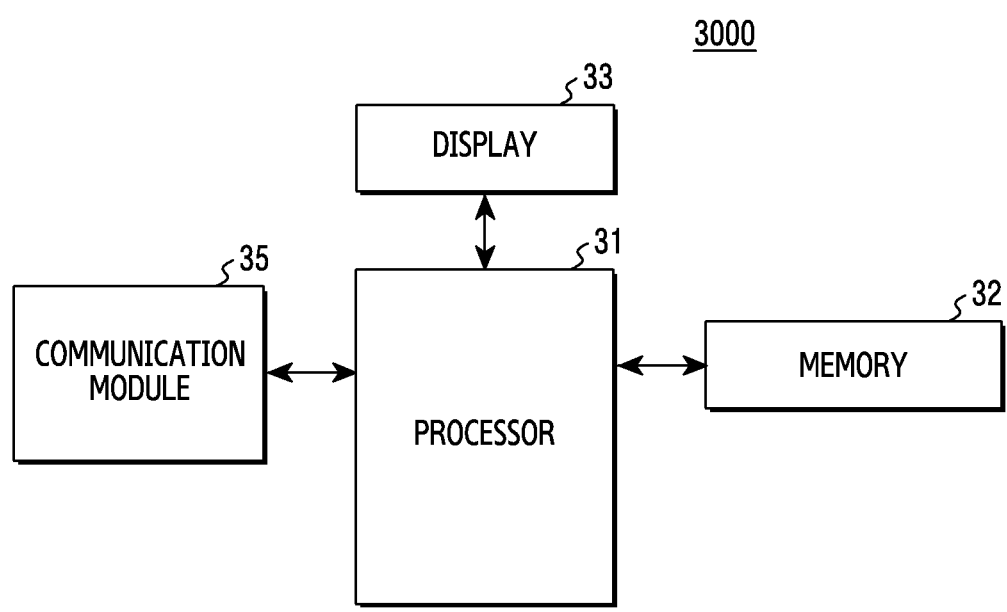
FIG. 3B is a block diagram illustrating a configuration of an electronic device according to an embodiment of the disclosure.

FIG. 3B is a block diagram illustrating a configuration of an electronic device according to an embodiment of the disclosure.

Referring to FIG. 3B, the electronic device 3000 according to an embodiment of the disclosure may include an entirety or a part of the electronic device 301 shown in FIG. 3A.

The electronic device 3000 (for example, the second electronic device 30 of FIGS. 1 and 2, the electronic device 301 of FIG. 3A) according to an embodiment of the disclosure may include a processor 31, a memory 32, a display 33, and a communication module 35.

The processor 31 (for example, the processor 320 of FIG. 3A) according to an embodiment of the disclosure may control overall operations of the electronic device 3000. For example, the processor 31 may control the respective components of the electronic device 3000. The processor 31 may control the respective components, based on execution of a command or instructions stored in the memory 32, and may perform various functions.

The processor 31 according to an embodiment of the disclosure may be formed with a central process unit (CPU), an application processor (AP), a micro control unit (MCU), a micro processor unit (MPU), or the like. The processor 31 may be formed with a single core processor or a multi-core processor. According to another embodiment, the processor 31 may be a multi-processor formed with a plurality of processors. For example, the processor 31 may include an application processor and a communication processor (CP).

The processor 31 according to an embodiment of the disclosure may control a geofence setting (generation) procedure using an overlapping area. This will be described in detail below with reference to FIGS. 6A to 7.

The memory 32 (for example, the memory 330 of FIG. 3A) according to an embodiment of the disclosure may be positioned inside a housing of the electronic device 3000, and may be electrically (or functionally) connected with the processor 31. The memory 32 may store various programs, and may store data generated while the various programs are being performed, or downloaded data. The memory 32 may store various commands and/or instructions for operating the processor 31. The memory 32 may include at least one of an internal memory or an external memory.

The memory 32 according to an embodiment of the disclosure may store various commands and/or instructions for providing a geofence service.

The display 33 (for example, the display device 360 of FIG. 3A) according to an embodiment of the disclosure may be exposed through a first surface (for example, a front surface) of the housing of the electronic device 3000, and may provide an output function. For example, the display 33 may be formed with a liquid crystal display (LCD), a light emitting diode (LED) display, an organic LED (OLED) display, or a micro electromechanical system (MEMS) display, or an electronic paper display. According to a certain embodiment, the display 33 may include a touch panel to receive a user input, or may be integrally formed with the touch panel. The touch panel may include, for example, a first panel (not shown) to detect a touch using a finger, a second panel (not shown) to recognize an input by an electronic pen, and/or a third panel (not shown) to detect a pressure. The display 33 according to various embodiments of the disclosure may display a screen for setting a geofence. This will be described in detail below with reference to FIGS. 6B and 6C.

The communication module 35 (for example, the communication module 390 of FIG. 3A) according to an embodiment of the disclosure may be positioned inside the housing of the electronic device 3000, and may perform wired communication and/or wireless communication. For example, the communication module 35 may include at least one wireless (for example, mobile communication, WiFi, LiFi, or Bluetooth) communication circuit and/or at least one wired (for example, a high definition multimedia interface (HDMI), a display port (DP), or a universal serial bus (USB)) communication circuit.

The communication module 35 according to various embodiments of the disclosure may support performance of wired or wireless communication with a server (for example, the server 20) providing a geofence service. For example, the communication module 35 may transmit a position information request to another electronic device (for example, the first electronic device 10) through the server, and may receive position information of another electronic device, a geofence information including another electronic device, or alarm information from another electronic device through the server.

The communication module 35 according to various embodiments of the disclosure may transmit set geofence information to another electronic device through the server. For example, the communication module 35 may transmit, to another electronic device through the server, coordinates (for example, latitude and longitude) of a reference point, a radius, an attribute, and/or priority information. According to a certain embodiment, the communication module 35 may receive geofence information from an external server providing a geofence service which is run by a country or a specific service provider.

The electronic device 3000 may not include some of the above-described components, or may further include at least one other component (for example, a digital broadcasting module, a fingerprint recognition module, an audio processing module, a sensor module, etc.) which is equivalent to the above-described components.

An electronic device (for example, the second electronic device 30 of FIGS. 1 and 2) according to various embodiments of the disclosure may include a display (for example, the display device 360 of FIG. 3A, the display 33 of FIG. 3B), a wireless communication circuit (for example, the communication module 390 of FIG. 3A, the communication module 35 of FIG. 3B) providing wireless communication, a processor (for example, the processor 320 of FIG. 3A, the processor 31 of FIG. 3B) electrically connected with the display and the wireless communication circuit, and a memory electrically connected with the processor, and the memory may store instructions that, when being executed, cause the processor to: display a map for setting a geofence on the display; detect a gesture input of moving along the map; and, in response to an input of a geofence setting command, generate a geofence corresponding to a route corresponding to the gesture input by overlapping at least two circular zones each other.

According to various embodiments, the instructions may cause the processor to change sizes of the at least two circular zones in response to a width of the route.

According to various embodiments, the instructions may cause the processor to change the sizes of the at least two circular zones in response to whether there is an alternative route to the route.

According to various embodiments, the instructions may cause the processor to, in response to at least one circular zone being set to overlap a part of a previously generated first geofence, set the overlapping part of the first geofence as at least one new geofence.

Figure 4A:
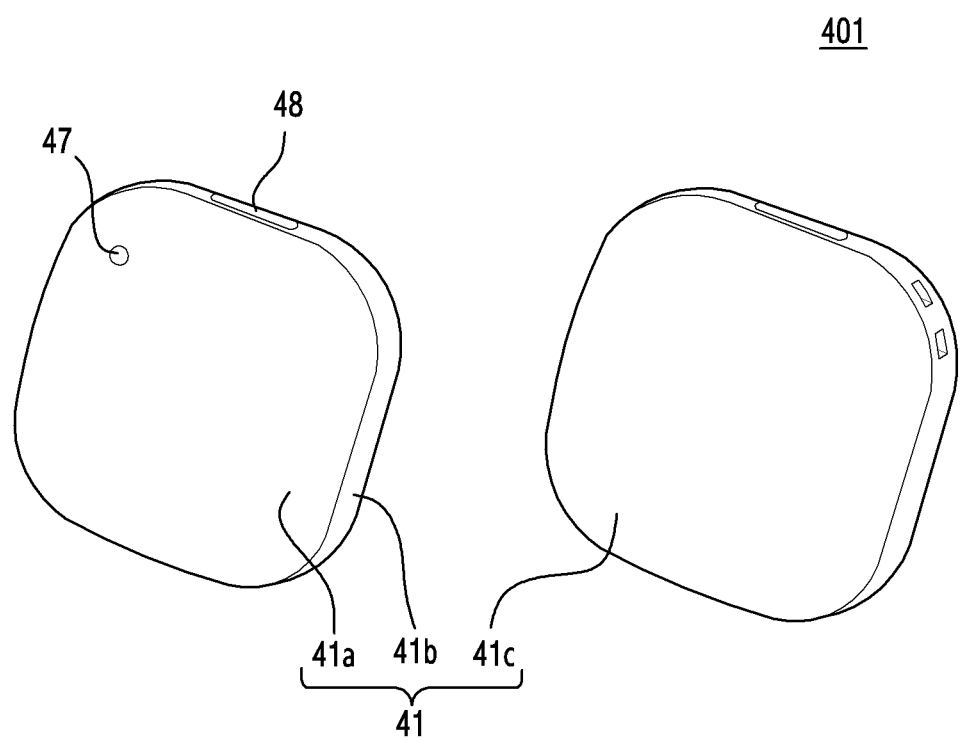
FIG. 4A is a view illustrating an exterior of an electronic device according to an embodiment of the disclosure.
Figure 4B:
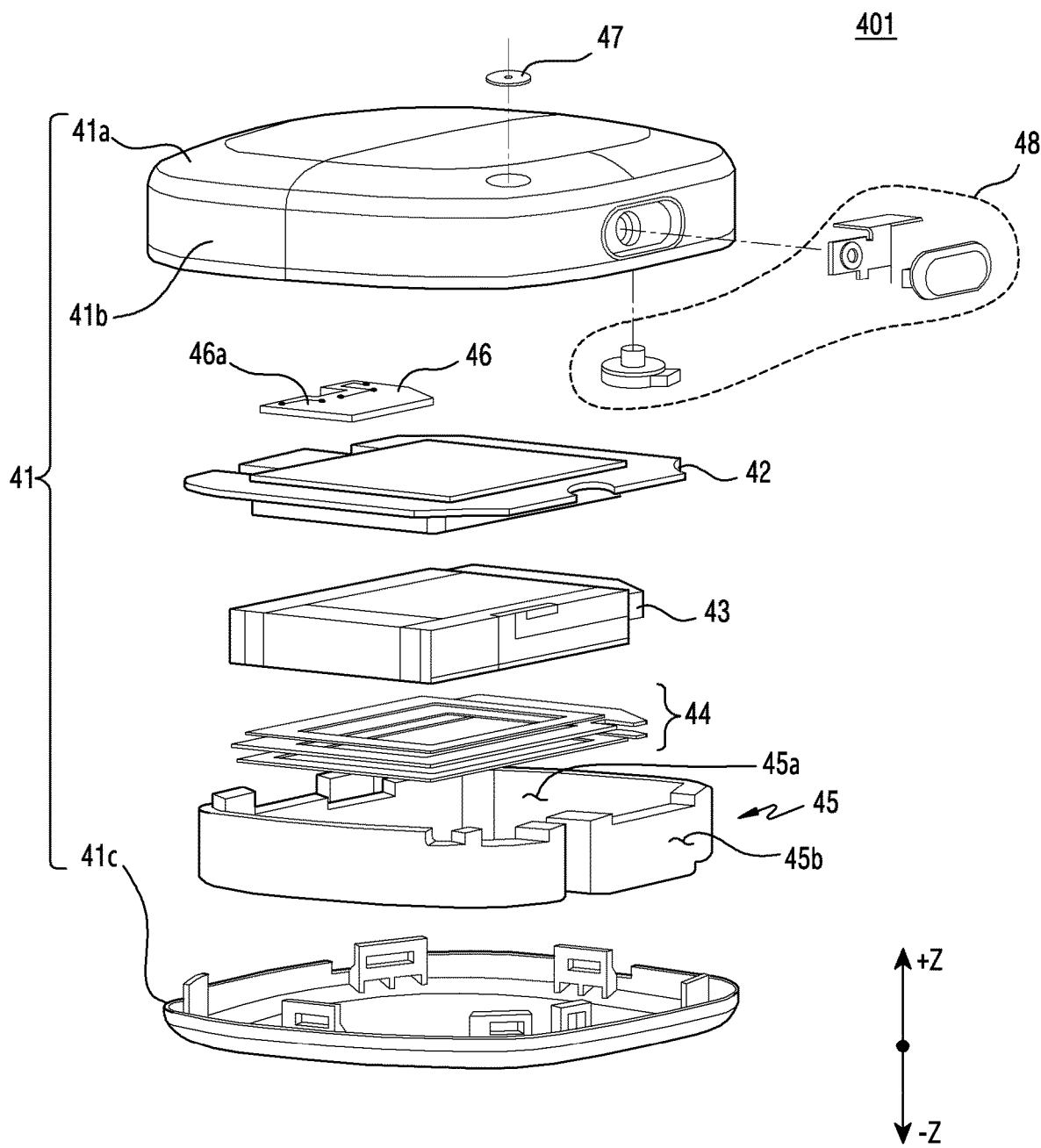
FIG. 4B is an exploded perspective view illustrating the electronic device according to an embodiment of the disclosure.

FIG. 4A is a view illustrating an exterior of an electronic device according to an embodiment of the disclosure, and FIG. 4B is an exploded perspective view illustrating the electronic device according to an embodiment of the disclosure.

Referring to FIGS. 4A and 4B, the electronic device 401 (for example, the first electronic device 10 of FIGS. 1 and 2) according to an embodiment of the disclosure may include a housing 41, a printed circuit board 42, a battery 43, an elastic member 44, a bracket 45, a radiation structure 46, an output device 47, and an input device 48.

According to various embodiments, the housing 41 may include a first plate 41a disposed to face in a front-facing direction (for example, a first direction (+Z)), a second plate 41c disposed to face in a rear-facing direction (for example, a second direction (−Z)) corresponding to the opposite direction of the front-facing direction, and a side surface member 41b disposed between the first plate 41a and the second plate 41c.

According to a certain embodiment, the housing 41 may include an upper structure and a lower structure, and the upper structure and the lower structure may be coupled to each other, thereby forming an inner space. The upper structure may include a plate (for example, the first plate 41a) facing in the first direction (+Z), and a side surface (for example, the side surface member 41b) extended from the plate, and the lower structure may include a plate (for example, the second plate 41c) facing in the second direction (−Z) and a side surface extended from the plate.

According to various embodiment, the first plate 41a may form a front cover of the electronic device 401, and the second plate 41c may form a rear cover of the electronic device 401. In addition, the side surface member 41b may be configured to surround the space formed between the first plate 41a and the second plate 41c at least in part.

According to various embodiments, the second plate 41c may be disposed on the second direction (−Z) of the electronic device 401 to form an exterior of the electronic device 401 along with the side surface member 41b and the first plate 41a. According to a certain embodiment, the second plate 41c may be removably coupled. A user may replace a storage medium (for example, a subscriber identity module (SIM) card or an SD card) or a battery 43 with the second plate 41c being decoupled.

According to various embodiments, the first plate 41a and the second plate 41c may include at least one of a curved shape or a flexible shape, in addition to a planar plate-type shape. In another example, an outer surface of the side surface member 41b may have at least a portion formed in at least one of a cured shape or a flexible shape. Since at least a portion of the housing 41 of the electronic device 401 has a curved shape or a flexible shape as described above, the user can easily grip the electronic device 401 and easily click at least one button 48.

According to various embodiments, the housing 41 may accommodate various electronic components. At least a portion of the housing 41 (for example, a certain area of the first plate 41a, the second plate 41c, or the side surface member 41b) may be formed with a conductive material. For example, at least a portion of the housing 41 forming the exterior of the electronic device 401 may be formed with a conductive material. According to a certain embodiment, at least a portion of the conductive material of the housing 41 (for example, the side surface member 41b) may be utilized as an antenna device, for example, a radiation conductor. According to another embodiment, at least a portion of the housing 41 (for example, the side surface member 41b) may be insulated from the bracket 45, and may be electrically connected to a communication module (not shown) mounted on the printed circuit board 42, and may be utilized as an antenna device.

According to an embodiment, the printed circuit board 42, the battery 43, the elastic member 44, the bracket 45 and/or the radiation structure may be accommodated inside the housing 41.

According to various embodiments, the printed circuit board 42 may have a processor (not shown), a memory (not shown), a sensor module (not shown), a communication circuit (not shown), a positioning circuit (not shown), various interfaces (not shown), a power management module (not shown), etc. mounted thereon. The printed circuit board 42 may be fastened to the first plate 41a through a screw, a fastening structure, or the like.

According to various embodiments, the bracket 45 may be formed with a metallic material and/or a non-metallic material (for example, polymer), and may be disposed between the first plate 41a and the second plate 41c of the housing 41.

According to various embodiments, the bracket 45 may supplement stiffness of the electronic device 401. For example, the housing 41 may have a plurality of openings or recessed portions formed according to arrangements of the electronic component in the electronic device 401, but the openings or recessed portions may reduce the stiffness of the housing 41 or the electronic device 401. To prevent (compensate for) the reduction of the stiffness, the electronic device 401 may have the bracket 45 mounted in and/or fastened to the housing 41.

According to a certain embodiment, the bracket 45 may be formed with the second plate 41c as uni-body, such that the user is prevented from decoupling the bracket 45 and the second plate 41c arbitrarily.

Although not shown in FIGS. 4A and 4B in detail, various structures may further be formed on surfaces of the housing 41 and the bracket 45 according to arrangements of the electronic components disposed inside the electronic device 401, or a coupling structure between the housing 41 and the bracket 45. For example, spaces for accommodating integrated circuit chips mounted on the printed circuit board 42 may be formed in the housing 41 and/or the bracket 45, respectively. The spaces for accommodating the integrated circuit chips may be formed in a recessed shape or in a shape of a rib surrounding the integrated circuit chip. According to various embodiments, fastening structures or fastening holes corresponding to each other may be formed on the housing 41 and the bracket 45. For example, by fastening a fastening member such as a screw into a fastening hole, the housing 41 and the bracket 45 may be fastened to each other while facing each other or with the bracket 45 being accommodated in the housing 41.

According to various embodiments, the battery 43 may be a device for supplying power to at least one component, and for example, may include a primary battery which is not rechargeable, or a secondary battery which is rechargeable, or a fuel battery. The battery 43 may be integrally formed with an inside of the electronic device 401, or may be removably disposed in the electronic device 401. The battery 43 may be electrically connected with the printed circuit board 42.

According to various embodiments, the elastic member 44 may be mounted inside the bracket 45, and may elastically support the battery 43. The elastic member 44 may be disposed to face the printed circuit board 42 with reference to the battery 43, and may include adhesive members formed on both side surfaces thereof to adhere to the battery 43 and the bracket 45.

According to various embodiments, the bracket 45 may have an accommodation space 45a formed therein to accommodate the battery 43. The battery 43 accommodated in the accommodation space 45a may be disposed in parallel with the printed circuit board 42 without contacting. For example, the battery 43 may be seated in the accommodation space 45a of the bracket 45, and a side surface member 45b (for example, a border area) of the bracket 45 may be configured to surround the side surface of the battery 43. A height of the side surface member 45b of the bracket 45 (for example, a length of the side surface of the bracket 45 on the Z-axis) may be higher than a height of the battery 43 (for example, a length of the side surface of the battery on the Z-axis).

The side surface member 45b of the bracket 45 may be seated on a surface of the printed circuit board 42 and/or the first plate 41a of the housing 41.

According to various embodiments, the radiation structure 46 may include a conductive pattern 46a, and may be electrically connected with the printed circuit board 42 and may be mounted inside the housing 41. For example, the radiation structure 46 may be positioned between the first plate 41a and the bracket 45 or between the second plate 41c and the bracket 45. The conductive pattern 46a may be an antenna which transmits and receives radio waves or generates a magnetic field. The radiation structure 46 may be formed to provide wireless communication by using an LPWAN. For example, the LPWAN may include a network such as NB-IoT, LTE-M, LoRa, sigfox, EC-GSM, or the like.

According to an embodiment of the disclosure, the conductive pattern 46a may be formed as a portion of the radiation structure 46 by using laser direct structuring (LDS). According to a certain embodiment, the conductive pattern 46a may be at least a portion of metal forming at least a portion of the housing 41 (for example, the side surface member 41b) of the electronic device 401.

According to various embodiments, the output device 47 may visually provide information to the user of the electronic device 401. For example, the output device 47 may include at least one light emitting device (for example, a light emitting diode (LED)) positioned on one side (for example, the first plate 41a) of the housing 41, and a control circuit to control the at least one light emitting device. The control circuit may control a color, a light emitting position, a light emitting interval, etc. of the at least one light emitting device according to a set rule, in order to provide a notification (alarm) regarding entry to or exit from a geofence. As described above, the output device 47 may visually notify the user of entry to (or exit from) a danger area or a periphery of the danger area. According to a certain embodiment, the output device 47 may include a speaker (not shown) and/or a vibration motor (not shown) to provide the notification by using sense of hearing (for example, a sound) or touch (for example, vibration).

According to various embodiments, the input device 48 may be disposed on one side (for example, a front surface or a side surface) of the electronic device 401. The input device 48 may include at least one button key. For example, the at least one button key may include a power key. According to a certain embodiment, the at least one button key may further include at least one function key for a specific function. For example, the at least one button key may include a function key to control on/off of an alarm function through the output device 47, and a function key to identify an alarm which is being received and to request end of the alarm. According to a certain embodiment, the input device 48 may provide a plurality of functions through the one function key. For example, the electronic device 401 may perform a first function (for example, a function of identifying an alarm) when the function key is inputted one time within a predetermined time, may perform a second function (for example, a power on/off function) when the function key is inputted for a predetermined time or longer, and may perform a third function (for example, an alarm on/off function) when the function key is inputted two times within a predetermine time. In another example, the electronic device 401 may perform a fourth function (for example, a function of pairing with an external electronic device) when the function key is inputted and held for a predetermined time or longer.

Figure 4C:
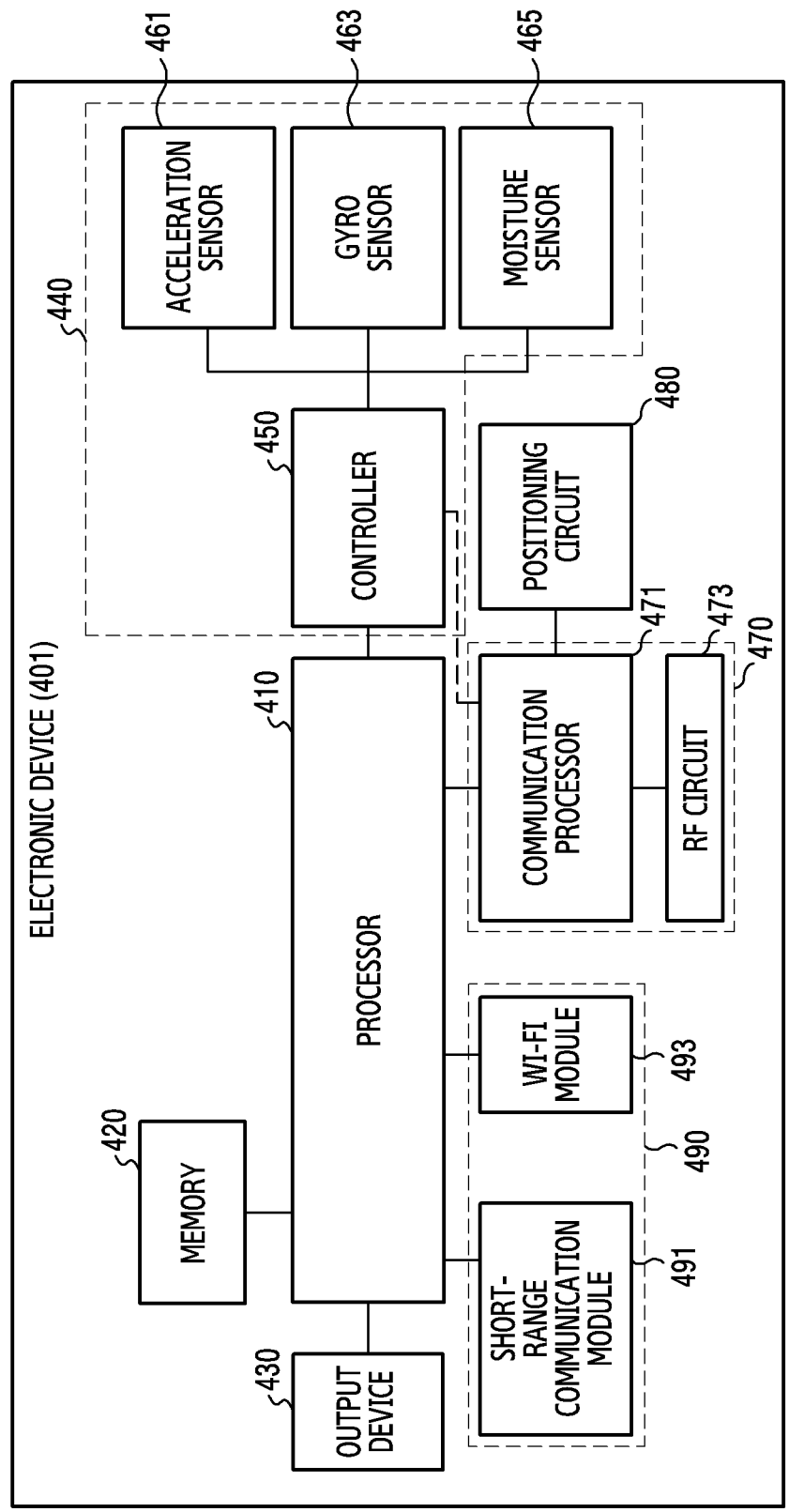
FIG. 4C is a block diagram illustrating a configuration of an electronic device according to an embodiment of the disclosure.

FIG. 4C is a block diagram illustrating a configuration of an electronic device according to an embodiment of the disclosure.

Referring to FIG. 4C, the electronic device 401 (for example, the first electronic device 10 of FIGS. 1 and 2) according to an embodiment of the disclosure may include a processor 410 (for example, an AP), a memory 420, an output device 430, a sensor module 440, a first communication circuit 470, a positioning circuit 480, and a second communication circuit 490. The electronic device 401 may further include a battery, a power management module, an input device, a connection terminal, etc. although they are not illustrated in FIG. 4. According to a certain embodiment, the electronic device 401 may omit at least one of the components or may further include other components.

According to various embodiments of the disclosure, the processor 410 may control at least one other component (for example, a hardware or software component) of the electronic device 401 connected to the processor 410 by driving software, for example, and may perform processing and computation of various data. The processor 410 may store commands or data received from other components (for example, the sensor module 440, the first communication circuit 471, the second communication circuit 490, etc.) in the memory 420.

According to various embodiments of the disclosure, the processor 410 may include an application processor operating in the electronic device 401 as a main processor. According to various embodiments of the disclosure, the processor 410 may perform an operation related to the output device 430 (for example, a light emitting diode (LED)) and the input device (for example, a button (not shown)) included on one side of the electronic device 401, a power management operation, an operation of receiving information from the sensor module 440, an operation of managing the first communication circuit 470 or the second communication circuit 490, etc.

According to various embodiments of the disclosure, the processor 410 may determine a position of the electronic device 401, and may transmit a result of the determination to a server (for example, the server 20). For example, the processor 410 may connect a session with the server, and may receive geofence information from the server and may store the geofence information in the memory 420.

According to various embodiments of the disclosure, the processor 410 may select a representative geofence according to a set rule when a plurality of geofences overlap one another. For example, the processor 410 may identify metadata of the geofences, and may select a representative geofence by considering a priority, whether the geofence includes a danger area, a movement direction, etc. This will be described in detail below with reference to FIG. 5C.

According to various embodiments of the disclosure, the processor 410 may provide an alarm according to entry to or exit from a geofence. For example, the processor 410 may provide an alarm when the electronic device enters a danger area or a periphery of the danger area, or leaves the danger area. According to a certain embodiment, the processor 410 may provide an alarm regarding entry to or exit from a geofence. For example, the processor 410 may cause the output device 430 to emit light according to a designated rule (for example, to flicker at predetermined intervals, to emit light of a specific color). According to another embodiment, the processor 410 may provide the alarm through sense of hearing (for example, a sound) or touch (for example, vibration). This will be described in detail below with reference to FIG. 8.

According to various embodiments of the disclosure, the processor 410 may change a position measurement interval. For example, the processor 410 may make the position measurement interval short in an important area (for example, a danger area). Alternatively, the processor 410 may change the measurement interval according to a shortest distance to a boundary of a geofence. For example, when the shortest distance to the boundary falls within a set value, the processor 410 may make the measurement interval short. In another embodiment, the processor 410 may measure a movement speed of the electronic device 401 through the sensor module 440 or the positioning circuit 480, and may change the measurement interval according to the movement speed. For example, the processor 410 may make the measurement interval short when the movement speed is high.

According to a certain embodiment, the processor may change a position measurement method from a normal mode to a precision mode. The normal mode refers to a mode in which a position is measured only by using a GPS, and the precision mode refers to a mode in which a position is measured by using a Wi-Fi positioning system (WPS), cell information, access point (AP) information, in addition to the GPS. Changing the position measurement interval will be described in detail below with reference to FIG. 9.

According to various embodiments, the electronic device 401 may include an auxiliary processor which is operated independently from the processor 410, and additionally or alternatively, uses lower power than the processor 410, or is specialized for a specific function. According to an embodiment, the auxiliary processor may include a controller 450 (for example, a sensor hub, a micro controller unit (MPU)) of the sensor module 440, and a communication processor (CP) 471 of the first communication circuit 470. In various embodiments, at least a part of the auxiliary processor may be operated separately from the processor 410, or may be embedded in the processor 410.

According to an embodiment, the auxiliary processor (for example, the controller 450, the communication processor 471) may control at least a part of a function or states related to at least one component (for example, a plurality of sensors 461, 463, 465, a radio frequency (RF) circuit 473, or a second communication circuit 490) of the components of the electronic device 401, in replacement of the processor 410 when the processor 410 is in an inactive state (for example, a sleep state), or along with the processor 410 when the processor 410 is in an active state (for example, performs an application). According to an embodiment, the auxiliary processor may be implemented as a part of other components related thereto functionally (for example, the plurality of sensors 461, 463, 465, the RF circuit 473, or the second communication circuit 490).

The memory 420 according to various embodiments of the disclosure may store various data used by at least one component of the electronic device 401 (for example, the processor 410 or the sensor module 440, the first communication circuit 470, the positioning circuit 480, and the second communication circuit 490), for example, software (or program) and input data or output data regarding a command related to the software. The memory 420 may include a volatile memory or a nonvolatile memory. The memory 420 according to various embodiments of the disclosure may store received geofence information.

The output device 430 according to various embodiments is a device which visually provides information to the user of the electronic device 401, and may include, for example, a light emitting device (for example, a light emitting diode (LED)) and a control circuit to control the corresponding light emitting device. The control circuit may control light emission of the light emitting device according to a set rule to provide an alarm according to entry to or exit from a geofence.

The sensor module 440 according to various embodiments of the disclosure may generate an electric signal or a data value corresponding to an internal state (for example, moisture (invasiveness) or temperature) or an external environment state (for example, a movement state or a stop state) of the electronic device 401. According to various embodiments, the sensor module 440 may include the controller 450 and the plurality of sensors 461, 463, 465. According to an embodiment, the controller 450 may be referred to as a sensor hub or an MPU. According to an embodiment, the sensor module 440 may include an acceleration sensor 461, a gyro sensor 463, or a moisture sensor 465.

The first communication circuit 470 according to various embodiments of the disclosure may perform wireless communication with the server by using an LPWAN which is one of mobile communication networks. For example, the first communication circuit 470 may support LoRa, sigfox which use a mobile communication unlicensed band, and LTE-M, NB-IoT, or EC-GSM which use a mobile communication licensed band. According to an embodiment, the first communication circuit 470 may include the communication processor 471 and the RF circuit 473.

The first communication circuit 470 according to various embodiments of the disclosure may connect a communication channel with a server supporting a geofence service (for example, the server 20), and may communicate therewith. For example, the first communication circuit 470 may receive geofence information from the server. Alternatively, the first communication circuit 470 may transmit current position information, a geofence information including the electronic device, alarm information, etc. to the server.

The positioning circuit 480 according to various embodiments of the disclosure is a module for measuring (obtaining) a position of the electronic device 401, and may include, for example, a GNSS module or a GPS module. According to an embodiment, the positioning circuit 480 may measure the position of the electronic device 401 by using WPS, AP information, or the principle of triangulation. The positioning circuit 480 according to various embodiments of the disclosure may measure the position at set intervals or when receiving a position measurement request from an external device (for example, the server). The position measurement interval may be changed.

According to various embodiments, the electronic device 401 may be configured to have the positioning circuit 480 connected to the communication processor 471 and the controller 450, respectively. According to an embodiment, the controller 450 and the positioning circuit 480 may not be connected with each other as shown in FIG. 4, and the communication processor 471 may be configured to deliver position information obtained through the positioning circuit 480 to the controller 450.

The second communication circuit 490 according to various embodiments of the disclosure may connect a wireless communication channel between the electronic device 401 and an external server (for example, the server 20), and may support performance of communication through the connected communication channel. According to an embodiment, the second communication circuit 490 may include a short-range communication module 491 (for example, a BT module, a BLE module) for short-range wireless communication, and a Wi-Fi module 493 for wireless internet communication, and may communicate with the external server by using a corresponding communication module. The second communication circuit 490 may receive geofence information from the external server, or may transmit current position information, a geofence information including the electronic device, alarm information, etc. to the external server, similarly to the first communication circuit 470.

An electronic device (for example, the first electronic device 10 of FIGS. 1 and 2, or the electronic device 401 of FIG. 4) according to various embodiments of the disclosure may include: a wireless communication circuit (for example, the first communication circuit 470 of FIG. 4) configured to provide wireless communication by using an LPWAN; a positioning circuit (for example, the positioning circuit 480 of FIG. 4) configured to detect a position of the electronic device; a processor (for example, the processor 410 of FIG. 4) electrically connected with the wireless communication circuit and the positioning circuit; and a memory (for example, the memory 420 of FIG. 4) electrically connected with the processor, and the memory may store instructions that, when being executed, cause the processor to: receive information regarding a plurality of geofences from an external server (for example, the server 20 of FIGS. 1 and 2) through the wireless communication circuit; determine whether the detected position exists within two or more geofences; select one of the two or more geofences based on at least part of the information; and transmit a message including the position and the selected geofence to the external server through the wireless communication circuit.

According to various embodiments, the positioning circuit may include a global positioning system (GPS).

According to various embodiments, the information may include priorities of the two or more geofences.

According to various embodiments, the instructions may cause the processor to: determine whether the detected position exists within a first geofence from among the plurality of geofences at a first time; determine whether the detected position exists within the first geofence and a second geofence from among the plurality of geofences at a second time after the first time; and select the second geofence as the selected geofence.

According to various embodiments, the instructions may cause the processor to: determine whether the detected position exists within a first geofence and a second geofence from among the plurality of geofences at a first time; select the first geofence as the selected geofence regarding the first time; determine whether the detected position exists within the first geofence and the second geofence at a second time after the first time; and select the first geofence as the selected geofence regarding the second time.

According to various embodiments, the instructions may cause the processor to: receive information regarding a first geofence from the external server; receive information regarding a second geofence from the external server after receiving the information regarding the first geofence; determine whether the detected position exists within the first geofence, the second geofence, and a third geofence from among the plurality of geofences at a first time; determine whether the detected position exists within the first geofence and the second geofence, rather than within the third geofence, at a second time after the first time; and select the first geofence as the selected geofence regarding the second time.

According to various embodiments, the instructions may cause the processor to: determine whether the detected position is in a danger area or a periphery of the danger area; provide an alarm according to a result of the determining; and, when the detected position exists within two or more geofences, determine whether the detected position is in a danger area with reference to the selected geofence.

According to various embodiments, the instructions may cause the processor to: determine whether the detected position is in a danger area, and to change a position measurement interval according to a result of the determining or change the position measurement interval according to a shortest distance between the detected position and a boundary of a geofence; and, when the detected position exists within two or more geofences, determine whether the detected position is in a danger area with reference to the selected geofence.

Figure 5A:
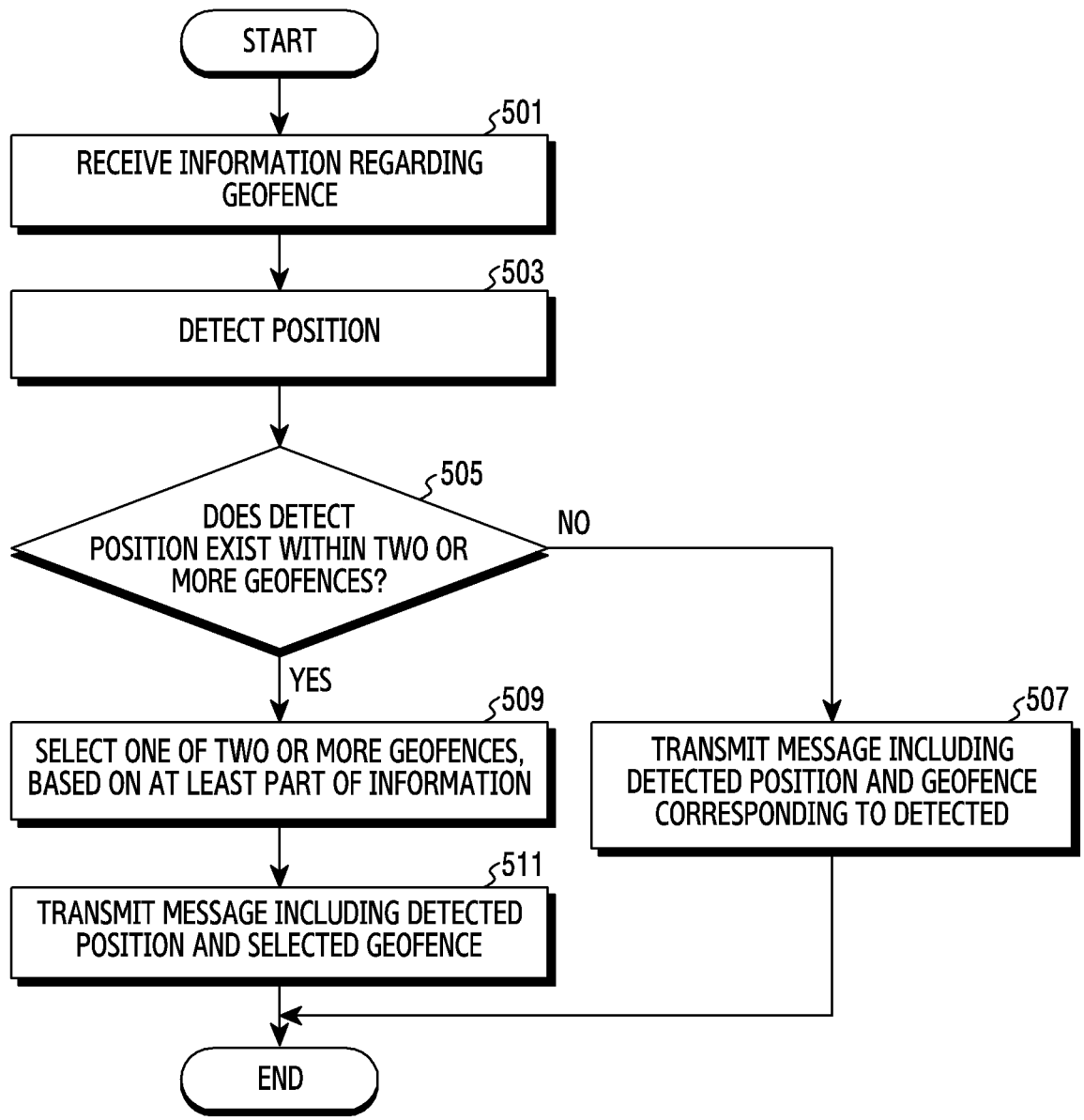
FIG. 5A is a sequence diagram illustrating a method for providing geofence information of an electronic device according to an embodiment of the disclosure.
Figure 5B:
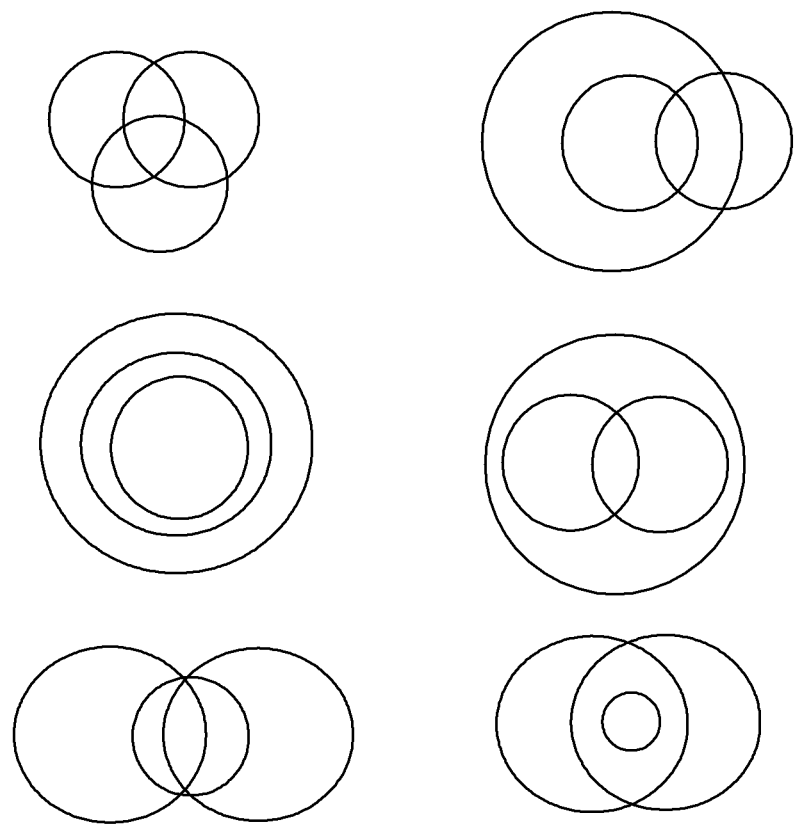
FIG. 5B is a view illustrating examples of a plurality of geofences overlapping one another according to an embodiment of the disclosure.

FIG. 5A is a sequence diagram illustrating a method for providing geofence information of an electronic device according to an embodiment of the disclosure, and FIG. 5B is a view illustrating examples of a plurality of geofences overlapping one another according to an embodiment of the disclosure.

Referring to FIGS. 5A and 5B, in operation 501, a processor (for example, the processor 410 of FIG. 4) of the electronic device (for example, the first electronic device 10 of FIGS. 1 and 2, the electronic device of FIG. 4) according to an embodiment of the disclosure may receive information regarding a geofence (hereinafter, geofence information). For example, the processor may receive geofence information from a server (for example, the server 20 of FIGS. 1 and 2) through a communication module (for example, the first communication circuit 470 of FIG. 4). The geofence information may be generated by another electronic device (for example, the second electronic device 30 of FIGS. 1 and 2, the electronic device 301 of FIG. 3A, the electronic device 3000 of FIG. 3B), and may be stored in the server, or may be received from an external server providing a geofence service and may be stored in the server. The geofence information may include coordinates (for example, latitude or longitude) of a reference point, a radius, an attribute (for example, a danger area, a safety area, etc.), priority information, etc. The geofence information may include a plurality of geofences overlapping one another at least in part. For example, the plurality of geofences may be formed in circular shapes having the same or different radii as shown in FIG. 5B, and may overlap one another at least in part in various shapes. Although FIG. 5B illustrates various examples of three geofences overlapping one another at least in part, this is merely an example and does not limit embodiments of the disclosure. The received geofence information may be stored in a memory (for example, the memory 420 of FIG. 4).

In operation 503, the processor according to an embodiment of the disclosure detects a position. For example, the processor may detect a current position through a positioning circuit (for example, the positioning circuit 480 of FIG. 4) at set intervals, or may detect a current position when receiving a position information request from the server 20 based on a request of an external electronic device (for example, the second electronic device 30 of FIG. 1). The position may be latitude and longitude information.

In operation 505, the processor according to an embodiment of the disclosure may determine whether the detected position exists within two or more geofences. For example, the processor may determine whether there exists at least one geofence including coordinate information of the detected current position, based on a reference point and radius information of the plurality of geofences which are stored.

When the detected position does not exist within the two or more geofences as a result of determining in operation 505, the processor according to an embodiment of the disclosure may transmit a message including the detected position and a geofence corresponding to the detected position to the server in operation 507. According to a certain embodiment, when the detected position does not exist within any geofence, the processor may transmit only the detected position information to the server.

When the detected position exists within the two or more geofences as a result of determining in operation 505, the processor according to an embodiment of the disclosure may select one of the two or more geofences based on at least part of the information in operation 509. For example, the processor may select the one geofence by considering a priority, a danger area, or a movement direction of the electronic device. This will be described in detail below with reference to FIG. 5C.

In operation 511, the processor according to an embodiment of the disclosure may transmit a message including the detected position and the selected geofence to the server.

According to the embodiment of the disclosure described above, when the electronic device is positioned in an area where a plurality of geofences overlap one another, the electronic device may select a representative geofence according to a set rule, and may provide the representative geofence to the user (for example, the user of the second electronic device), such that confusion of the user can be minimized.

FIG. 5C is a sequence diagram illustrating a method for selecting representative geofence information of the electronic device according to an embodiment of the disclosure.

Referring to FIG. 5C, when the detected position exists in the plurality of geofences as a result of determining in operation 505, the processor (for example, the processor 410 of FIG. 4) of the electronic device (for example, the electronic device 10 of FIGS. 1 and 2, or the electronic device 401 of FIG. 4) according to an embodiment of the disclosure may determine whether the geofences include a danger area (or an important area) in operation 531. For example, the processor may determine whether there is a geofence that includes an attribute corresponding to a danger area from among the plurality of geofences. The danger area may be set by a user of another electronic device (for example, the second electronic device 30, 301, 3000), or may be set by a geofence service provider.

When there exists the geofence including the attribute corresponding to the danger area as a result of determining in operation 531, the processor may select the geofence corresponding to the danger area in operation 533. According to a certain embodiment, when there are a plurality of danger areas, the processor may select the geofence by considering a priority. Alternatively, when a danger area set by the user and a danger area set by the geofence service provider overlap each other, the processor may select the geofence of the danger area set by the user as a representative geofence.

When the geofences do not include the danger area as a result of determining in operation 531, the processor may determine whether the geofences include a geofence of a new area in operation 535. When the geofences include the new area as a result of determining in operation 535, the processor may select the geofence of the new area in operation 537. For example, when the electronic device moves from an A area to an area where the A area and a B area overlap each other, the processor may select the geofence of the B area. Alternatively, when the electronic device moves from the area where the A area and the B area overlap each other to an area where the A area, the B area, and a C area overlap one another, the processor may select the geofence of the C area as a representative geofence.

When the geofences do not include the new area as a result of determining in operation 535, the processor may determine whether the included geofence is the same as the previous one in operation 539. When the included geofence is the same as the previous one as a result of determining in operation 539, the processor may maintain the previously selected geofence in operation 541. For example, when the electronic device is positioned in the area where the A area and the B area overlap each other, and the geofence of the B area is selected as a representative geofence, and the electronic device does not move from the area where the A area and the B area overlap each other, or moves within the area where the A area and the B area overlap each other, the processor may maintain the geofence of the B area previously selected as a representative geofence.

When the included geofence is not the same as the previous one as a result of determining in operation 539, the processor may select the first-generated geofence from among the plurality of geofences in operation 543. For example, when the electronic device moves from the area where geofences of the A area, the B area, and the C area overlap one another to the area where the geofences of the A area and the B area overlap each other, the processor may select the geofence of the A area which is generated first from among the geofences of the A area and the B area as a representative geofence. According to a certain embodiment, the processor may select a most recently generated geofence as a representative geofence.

When one geofence is selected through the above-described operations, the processor may proceed to operation 511 of FIG. 5A described above.

Figure 6A:
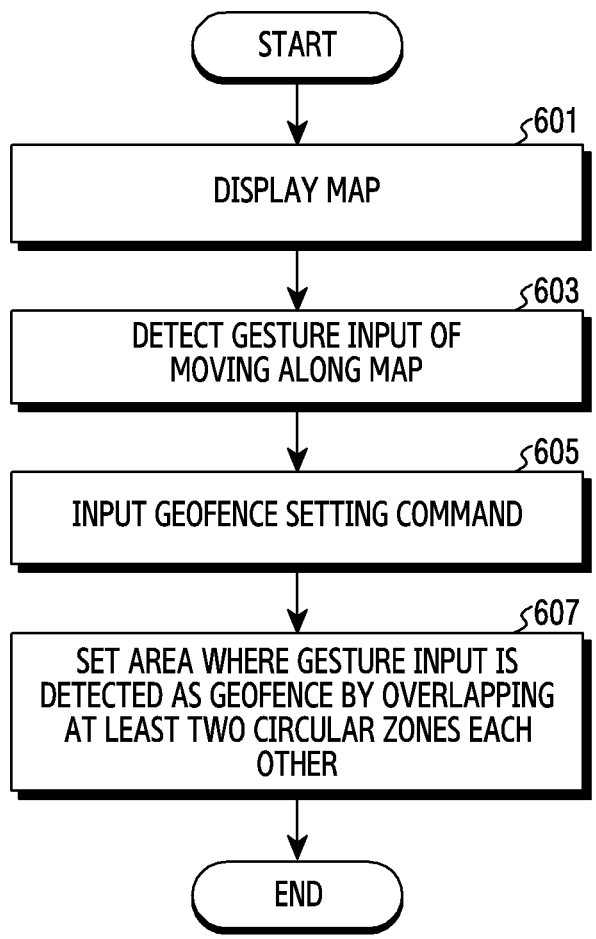
FIG. 6A is a sequence diagram illustrating a method for setting a geofence of an electronic device according to an embodiment of the disclosure.
Figure 6B:
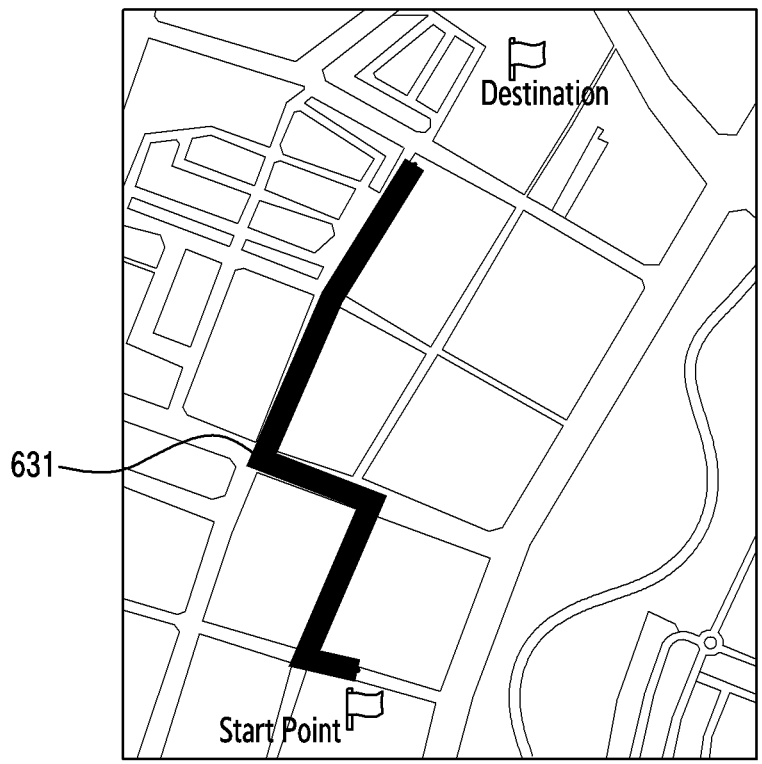
FIGS. 6B and 6C are views illustrating the method for setting the geofence of the electronic device according to an embodiment of the disclosure.
Figure 6C:
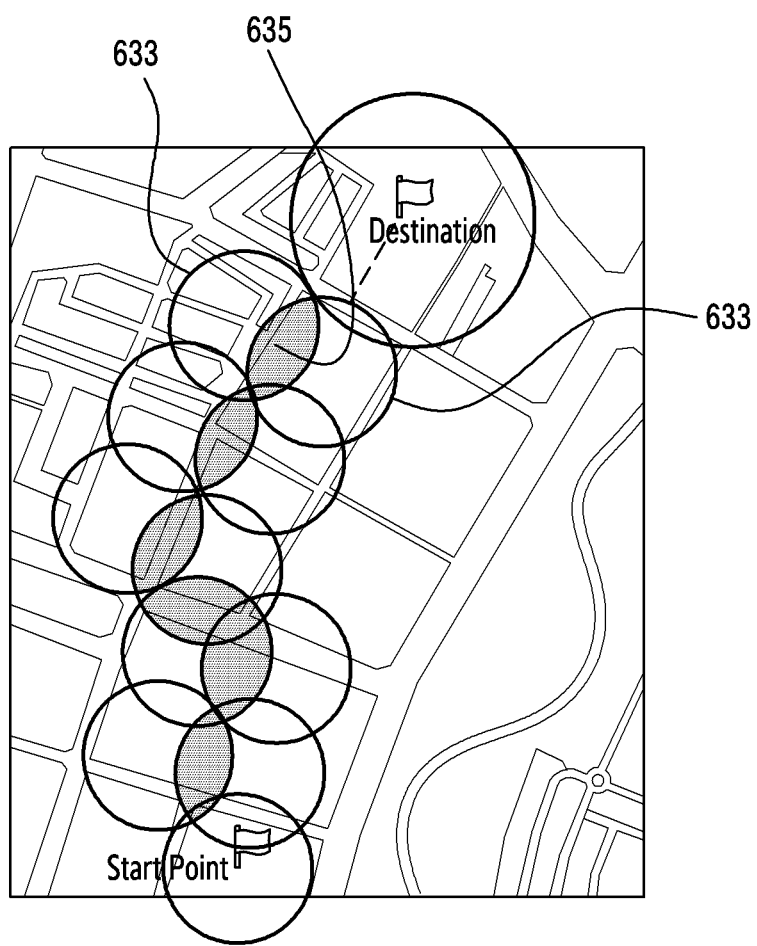

FIG. 6A is a sequence diagram illustrating a method for setting a geofence of an electronic device according to an embodiment, and FIGS. 6B and 6C are views illustrating the method for setting the geofence of the electronic device according to an embodiment of the disclosure.

Referring to FIGS. 6A to 6C, a processor (for example, the processor 320 of FIG. 3A, the processor 31 of FIG. 3B) of the electronic device (for example, the second electronic device 30 of FIGS. 1 and 2, the electronic device 301 of FIG. 3A, or the electronic device 3000 of FIG. 3B) according to an embodiment of the disclosure may display a map in operation 601. For example, the processor may display a map stored in a memory (for example, the memory 330 of FIG. 3A, the memory 32 of FIG. 3B), or a map received from a web server providing maps or a server (for example, the server 20) for managing geofences on a display (for example, the display device 360 of FIG. 3A or the display 33 of FIG. 3B), when receiving a geofence setting request.

In operation 603, the processor according to an embodiment of the disclosure may detect a user gesture input of moving along the map. For example, the user of the electronic device (for example, a parent) may draw a movement route 63 from a house (starting point) to a school (destination) on the map to check a route to or from the school of a user (for example, child) of another electronic device (for example, the first electronic device 10, 401).

In operation 605, the processor according to an embodiment of the disclosure may detect an input of a geofence area setting command. For example, the processor may detect a set menu input, a gesture input (for example, a long touch, a pressure touch, etc.).

According to a certain embodiment, the order of operations 603 and 605 may be changed. For example, the user may select an overlapping geofence setting menu when the map is displayed, and may draw a route to set a geofence.

In operation 607, the processor according to an embodiment of the disclosure may set the area where the gesture input is detected as a geofence by overlapping at least two circular zones each other. The circular zone may be a default shape for setting a geofence. For example, the processor may overlap portions of the plurality of circular zones 633 one another, such that overlapping portions 635 of the plurality of circular zones 633 have a minimum size (for example, a size of a road width) enough to include the route 631. The processor may generate one new geofence by connecting the plurality of overlapping areas. According to a certain embodiment, when the width of the route (for example, the width of a road) is smaller than a designated value (for example, 2 meters), the processor may generate the geofence by overlapping the circular zones to include main buildings on the periphery.

The circular zones used to generate the new geofence may have the same size, and at least some of the circular zones may have different sizes. For example, the processor may determine the size (for example, radius) of the circular zone, such that a minimum number of circular zones having the same size is required to generate the geofence area corresponding to the route. According to a certain embodiment, the processor may determine the size of the circular zone 633 according to a width of the route 631. For example, when the width of the route 631 is narrow, the processor may make the size of the circular zone 633 small, and, when the width of the route 631 is wide, the processor may make the size of the circular zone 633 large. In another example, when an alternative route (for example, an indirect route) exists in the proximity of the route 631, the processor may make the size of the circular zone 633 small, and, when there is no alternative route in the proximity of the route, the processor may make the size of the circular zone 633 large.

The processor may assign an attribute (for example, a degree of danger, a priority, etc.) to the generated geofence although this operation is not illustrated in FIG. 6A. For example, the processor may automatically assign the attribute by considering characteristic information (for example, a road, an alley, a shopping area, an area under construction, a school zone, etc.) of the area in which the geofence is set, or may manually assign the attribute according to a user input.

In the embodiment of the disclosure described above, a geofence in a new shape (for example, a route) rather than in a circular shape which is provided as default may be set by using overlapping areas, and a smaller area than a minimum size (for example, 100 meters in radius) of the circular zone may be set as a geofence, such that the geofence can be precisely set.

Figure 7A:
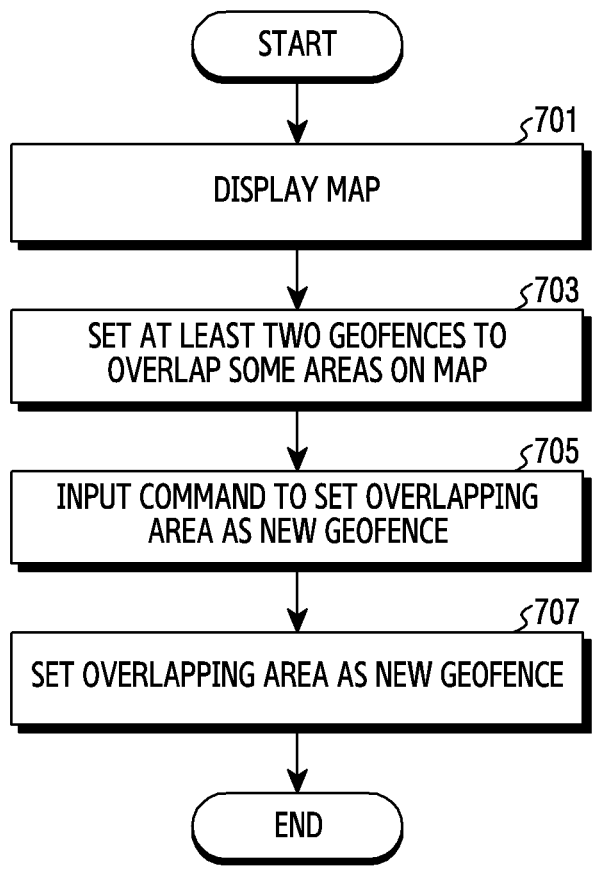
FIG. 7A is a sequence diagram illustrating a method for setting a geofence of an electronic device according to an embodiment of the disclosure.
Figure 7B:
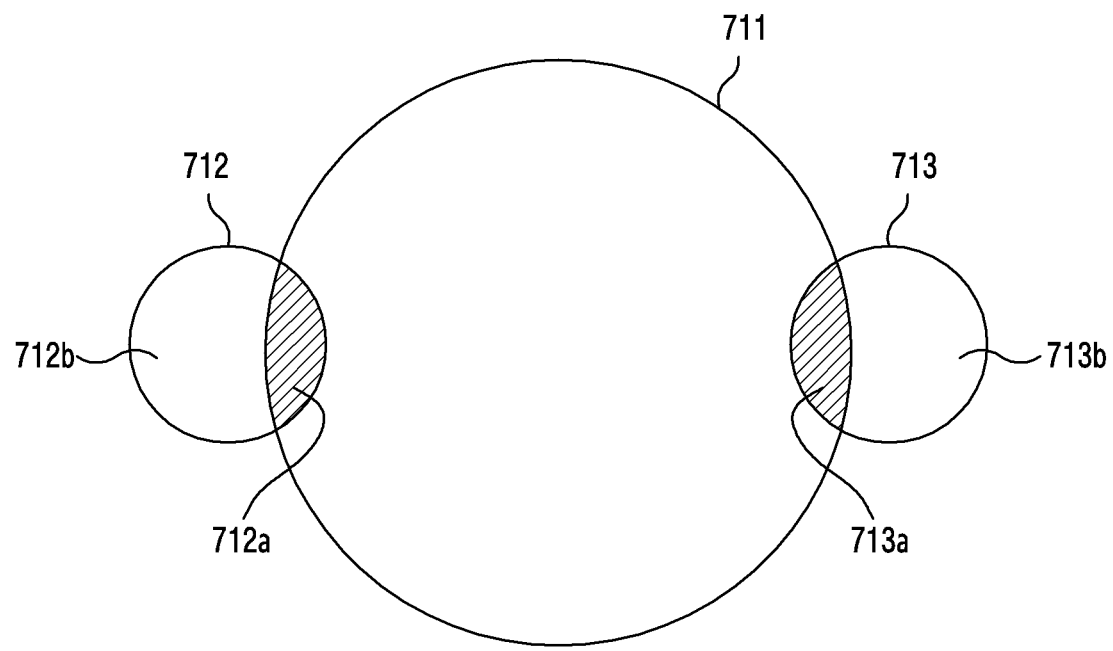
FIG. 7B is a view illustrating the method for setting the geofence of the electronic device according to an embodiment of the disclosure.

FIG. 7A is a sequence diagram illustrating a method for setting a geofence of an electronic device according to an embodiment, and FIG. 7B is a view illustrating the method for setting the geofence of the electronic device according to an embodiment of the disclosure.

Referring to FIGS. 7A and 7B, a processor (for example, the processor 320 of FIG. 3A, or the processor 31 of FIG. 3B) of the electronic device (for example, the second electronic device 30 of FIGS. 1 and 2, the electronic device 301 of FIG. 3A, or the electronic device 3000 of FIG. 3B) according to an embodiment of the disclosure may display a map in operation 701. For example, the processor may display a map stored in a memory (for example, the memory 330 of FIG. 3A, the memory 32 of FIG. 3B), or a map received from a web server providing maps or a server (for example, the server 20) for managing geofences on a display (for example, the display device 360 of FIG. 3A or the display 33 of FIG. 3B), when receiving a geofence setting request.

In operation 703, the processor according to an embodiment of the disclosure may detect (or receive) setting of at least two geofences where some areas overlap each other on the map. For example, the user may set a plurality of geofences such that an area where the user wishes to set a geofence is included in an overlapping area of circular geofences.

In operation 705, the processor according to an embodiment of the disclosure may detect an input of a command to set an overlapping area of the plurality of geofences as a new geofence. For example, the processor may detect a set menu input, a gesture input (for example, a long touch, a pressure touch, etc.).

In operation 707, the processor according to an embodiment of the disclosure may set (or generate) an area where at least two geofences overlap each other as a new geofence.

According to a certain embodiment, an embodiment of the present disclosure may set an entry or exit direction of a geofence by using an overlapping area. For example, as shown in FIG. 7B, the user may set a second geofence 712 to overlap an area of a first geofence 711 set in a school (for example, an area where a front gate is positioned), and may set a third geofence 713 to overlap another area of the first geofence 711 (for example, an area where a back gate is positioned). The processor may set, as new geofences, an area 712*a* where the first geofence 711 and the second geofence 712 overlap each other, and another area 713*a* where the first geofence 711 and the third geofence 713 overlap each other, and may exclude a non-overlapping area 712*b* of the second geofence 712 and a non-overlapping area 713*b* of the third geofence 713 from geofences.

By setting the geofences in this way, the user (for example, a parent) of the electronic device according to an embodiment of the disclosure may check whether user's child goes home from school through the front gate or the back gate. For example, an external electronic device (for example, the first electronic device 10), when detecting a position and delivering the position, may deliver information regarding whether the user's child goes home from school through the front gate or the back gate to a server (for example, the server 20), based on an attribute of the new geofences (for example, 712a or 713a) set in the electronic device (for example, the second electronic device 30). The user (for example, a parent) of the electronic device according to an embodiment of the disclosure may set to provide an alarm according to a route home from school. For example, the user (for example, a parent) may set to provide an alarm when the child goes home from school through the front gate or the back gate.

Figure 8:
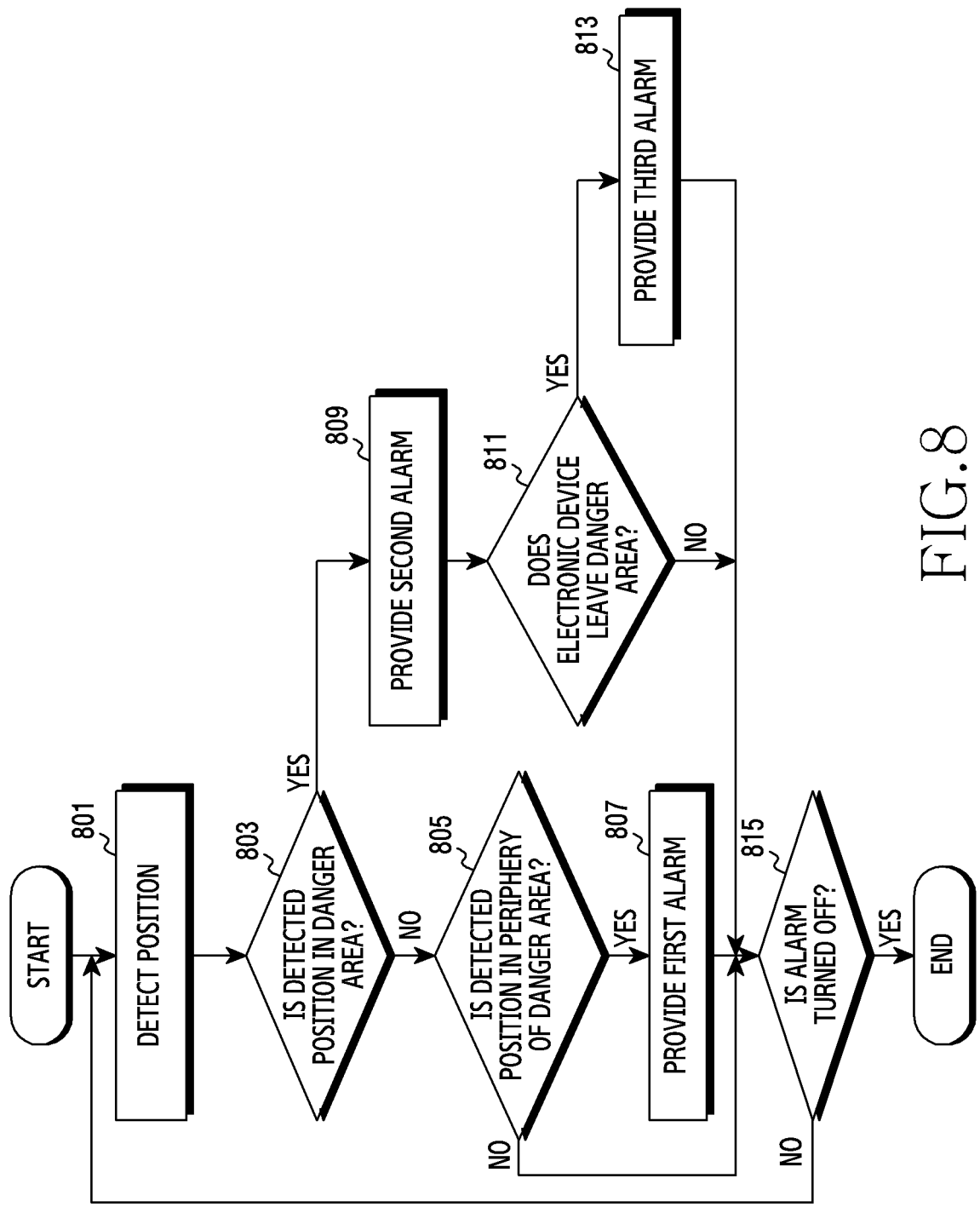
FIG. 8 is a sequence diagram illustrating a method for providing an alarm regarding entry to or exit from a geofence in an electronic device according to an embodiment of the disclosure.

FIG. 8 is a sequence diagram illustrating a method for providing an alarm regarding entry to or exit from a geofence in an electronic device according to an embodiment of the disclosure.

Referring to FIG. 8, a processor (for example, the processor 410 of FIG. 4) of the electronic device (for example, the first electronic device 10 of FIGS. 1 and 2, or the electronic device 401 of FIG. 4) according to an embodiment of the disclosure may detect a position in operation 801. For example, the electronic device may detect a position through a positioning circuit (for example, the positioning circuit 480) at set intervals or when receiving a request from a server (for example, the server of FIGS. 1 and 2). The position may be latitude and longitude information.

In operation 803, the processor according to an embodiment of the disclosure may determine whether the detected position is in a danger area. For example, the processor may determine whether the latitude and longitude of the detected position are included in a geofence set as a danger area. According to an embodiment, when the detected position is in an area where a plurality of geofences overlap one another, a representative geofence may be selected through the method described in FIGS. 5A to 5C, and it is determined whether the detected position is in the danger area through the representative geofence.

When the detection position is not in the danger area as a result of determining in operation 803, the processor according to an embodiment of the disclosure may determine whether the detected position is in a periphery of the danger area in operation 805. For example, the processor may determine whether the current position is within a set distance (for example, 100 meters) from a boundary of the geofence set as the danger area.

When the detected position is not in the periphery of the danger area as a result of determining in operation 805, the processor may proceed to operation 815, which will be described below. On the other hand, when the detected position is in the periphery of the danger area as a result of determining in operation 805, the processor may provide a first alarm in operation 807. For example, the processor may transmit the first alarm to a designated external electronic device (for example, the second electronic device) through the server. As described above, the processor may provide the first alarm before the electronic device enters the danger area. According to a certain embodiment, the processor may provide the first alarm when it is estimated that the electronic device is moving to the danger area through a movement route. According to an embodiment, the processor may provide the first alarm to the user of the electronic device through sense of vision (for example, light), hearing (for example, a sound), or touch (for example, vibration).

On the other hand, when the detected position is in the danger area as a result of determining in operation 803, the processor according to an embodiment of the disclosure may provide a second alarm in operation 809. For example, the processor may transmit the second alarm to the designated external electronic device through the server. According to a certain embodiment, when the detected position is in an area where the danger area and a non-danger area overlap each other, the processor may determine the area as the danger area, and may provide the second alarm. According to a certain embodiment, the processor may provide the second alarm to the user of the electronic device through sense of vision (for example, light), hearing (for example, a sound), or touch (for example, vibration).

In operation 811, the processor according to an embodiment of the disclosure may determine whether the electronic device leaves the danger area. When the electronic device does not leave the danger area as a result of determining in operation 811, the processor may proceed to operation 815, which will be described below. On the other hand, when the electronic device leaves the danger area as a result of determining in operation 811, the processor may provide a third alarm in operation 813. For example, the processor may transmit the third alarm to the designated external electronic device through the server. According to a certain embodiment, the processor may provide the third alarm to the user of the electronic device through sense of vision (for example, light), hearing (for example, a sound), or touch (for example, vibration).

In operation 815, the processor according to an embodiment of the disclosure may determine whether the alarm is turned off. The alarm-off may be received from the external electronic device through the server. For example, the alarm-off may be received when the user of the external electronic device identifies the alarm or finishes alarm providing setting.

When the alarm is not turned off as a result of determining in operation 815, the processor may return to operation 801 and may repeat the above-described operations. On the other hand, when the alarm is turned off as a result of determining in operation 815, the processor may finish providing the alarm.

The above-described alarm may be provided one time when an event occurs (for example, the electronic device enters the danger area, moves to the periphery of the danger area), or may be provided periodically until the event is disabled. The event may be disabled when the electronic devices goes away from the danger area or the periphery of the danger area, or when there is a request from the designated electronic device. The alarm providing interval may be changed according to a degree of danger of the danger area (or a danger level). For example, the alarm providing interval may be set shorter when the degree of danger is higher. The alarm providing interval may be set differently from a position detection interval, which will be described below.

Figure 9:
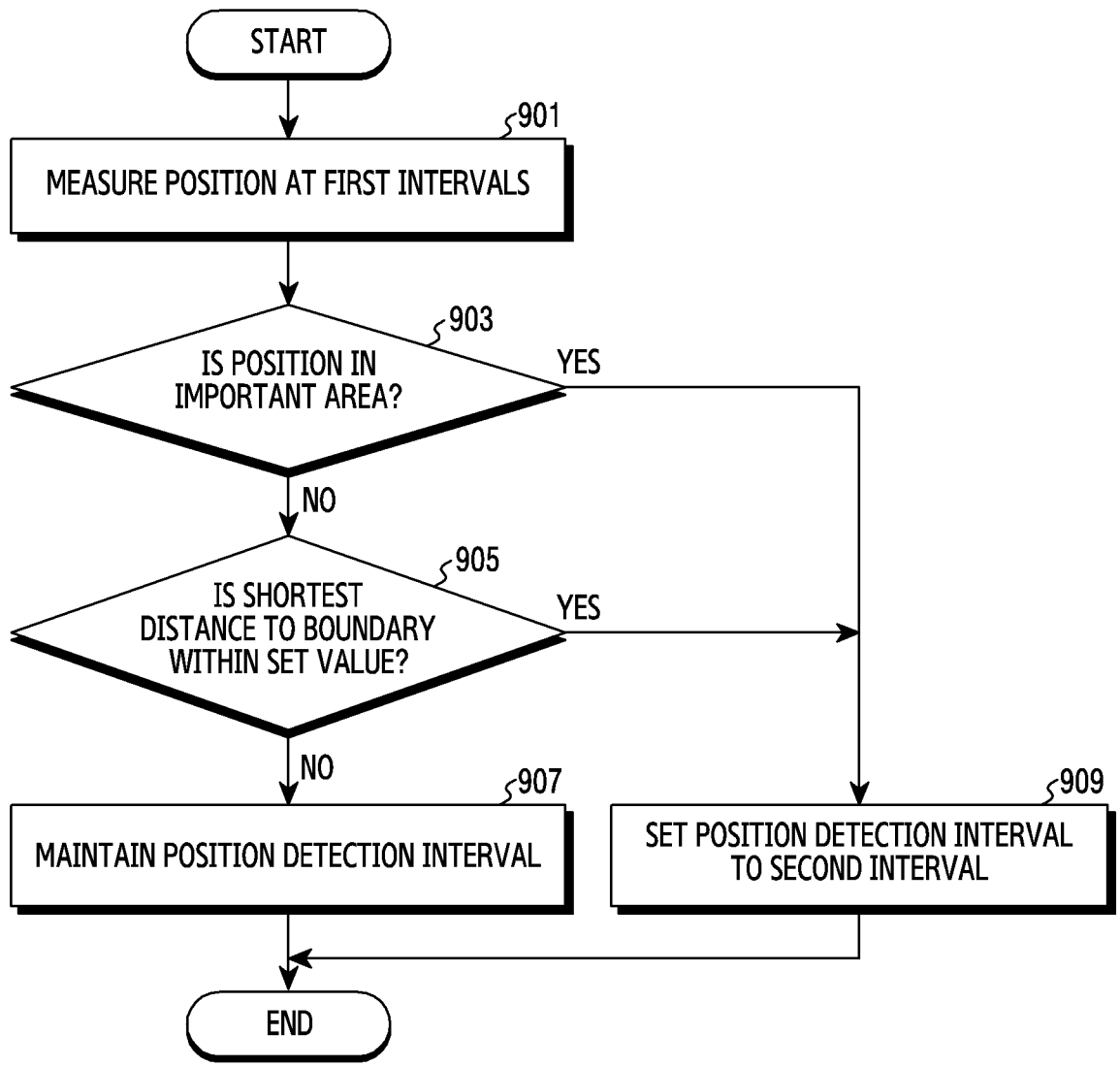
FIG. 9 is a sequence diagram illustrating a method for setting a position detection interval of an electronic device according to an embodiment of the disclosure.

FIG. 9 is a sequence diagram illustrating a method for setting a position detection interval of an electronic device according to an embodiment of the disclosure.

Referring to FIG. 9, a processor (for example, the processor 410 of FIG. 4) of the electronic device (for example, the first electronic device 10 of FIGS. 1 and 2, or the electronic device 401 of FIG. 4) according to an embodiment of the disclosure may measure a position at first intervals in operation 901. For example, the electronic device may detect current position information through a positioning circuit (for example, the positioning circuit 480 of FIG. 4) at first intervals. The position information may be latitude and longitude information.

In operation 903, the processor according to an embodiment of the disclosure may determine whether the current position is in an important area (for example, a danger area or an area of a high priority). According to a certain embodiment, when the current position is in an area where a plurality of geofences overlap one another, a representative geofence may be selected through the method described in FIGS. 5A to 5C, and it may be determined whether the current position is in the important area based on the representative geofence.

When the current position is in the important area as a result of determining in operation 903, the processor may set (or change) the position detection interval to a second interval in operation 909. The second interval may be an interval which is shorter than the first interval. As described above, the processor may perform precise position measurement by making the position detection interval short in the important area. According to a certain embodiment, the processor may change a position measurement method. For example, the processor may enhance accuracy of positioning by using not only a GPS but also a WPS, cell information, or AP information.

On the other hand, when the current position is not in the important area as a result of determining in operation 903, the processor may determine whether a shortest distance to a boundary of the current geofence or a boundary of a neighboring geofence is within a set value in operation 905.

When the shortest distance is within the set value as a result of determining in operation 905, the processor may proceed to operation 909 described above. On the other hand, when the shortest distance is not within the set value as a result of determining in operation 905, the processor may maintain the position detection interval in operation 907.

According to a certain embodiment, the processor may change the interval in stages according to a level of importance (or a degree of danger) of the geofence. For example, when the level of importance is set to 5 stages, the position detection interval may also be set to 5 stages.

According to a certain embodiment, the processor may change the position detection interval in stages according to a distance to the boundary of the geofence. For example, when the processor divides the distance to 5 stages, the position detection interval may be changed to 5 stages.

According to a certain embodiment, the processor may change the position detection interval in stages according to a movement speed of the electronic device. For example, when the movement speed is high, the processor may set the position detection interval short. The processor may change the movement speed and the position detection interval in stages.

FIG. 9 illustrates that, when the position is in the important area and the distance to the boundary is within the set value, the position detection interval is set to the second interval. However, different intervals may be set. For example, when the position is in the important area, the processor may set the position detection interval to the second interval, and, when the distance to the boundary is within the set value, the processor may set the position detection interval to a third interval.

A geofence management method of an electronic device (for example, the first electronic device 10 of FIGS. 1 and 2, the electronic device 401 of FIG. 4) according to various embodiments may include: receiving information regarding a plurality of geofences from an external server (for example, the server 20 of FIGS. 1 and 2) through a wireless communication circuit (for example, the first communication circuit 470 of FIG. 4) which provides wireless communication by using an LPWAN; detecting a position of the electronic device; when the detected position exists within two or more geofences, selecting one of the two or more geofences based on at least part of the information; and transmitting a message including the position and the selected geofence to the external server through the wireless communication circuit.

According to various embodiments, detecting the position may include detecting the position through a GPS performed at measurement intervals.

According to various embodiments, the information may include priorities of the two or more geofences.

According to various embodiments, selecting may include, when the detected position exists within a first geofence from among the plurality of geofences at a first time, and exists within the first geofence and a second geofence from among the plurality of geofences at a second time after the first time, selecting the second geofence as the selected geofence.

According to various embodiments, selecting may include, when the detected position exists within a first geofence and a second geofence from among the plurality of geofences at a first time, selecting the first geofence as the selected geofence regarding the first time, and, when the detected position exists within the first geofence and the second geofence at a second time after the first time, selecting the first geofence as the selected geofence regarding the second time.

According to various embodiments, selecting may include: receiving information regarding a first geofence from the external server, and receiving information regarding a second geofence from the external server after receiving the information regarding the first geofence; and, when the detected position exists within the first geofence, the second geofence, and a third geofence from among the plurality of geofences at a first time, and the detected position exists within the first geofence and the second geofence, rather than within the third geofence, at a second time after the first time, selecting the first geofence as the selected geofence regarding the second time.

According to various embodiments, the method may further include determining whether the detected position is in a danger area or a periphery of the danger area, and providing an alarm according to a result of the determining, and determining may include, when the detected position exists within two or more geofences, determining whether the detected position is in a danger area with reference to the selected geofence.

According to various embodiments, the method may further include at least one of: determining whether the detected position is in a danger area, and changing a position measurement interval according to a result of the determining; or changing the position measurement interval according to a shortest distance between the detected position and a boundary of a geofence, and determining may include, when the detected position exists within two or more geofences, determining whether the detected position is in a danger area with reference to the selected geofence.

The electronic device according to various embodiments may be one of various types of electronic devices. The electronic devices may include, for example, at least one of a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, and/or replacements for a corresponding embodiment. With regard to the description of the drawings, similar reference numerals may be used to refer to similar elements. It is to be understood that a singular form of a noun may include one or more of the things, unless the relevant context clearly indicates otherwise. As used herein, each of such phrases as "A or B," "at least one of A and/or B," "A, B, or C," or "at least one of A, B, and/or C" may include all possible combinations of the items enumerated together. As used herein, such terms as "1st," "2nd," "first" or "second" may modify corresponding components regardless of an importance or an order, be used to distinguish a component from another, and does not limit the corresponding components. It is to be understood that if an element (e.g., a first element) is referred to, "(operatively or communicatively) connected with," or "connected to" another element (e.g., a second element), it means that the element may be coupled with the other element directly, or via other element (e.g., a third element).

As used herein, the term "module" includes a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 340) including instructions that are stored in a machine readable storage medium (e.g., internal memory 336, external memory 338, the memory 32 or the memory 420) that is readable by a machine (e.g., computer). The machine may invoke instructions stored in the storage medium, be operated to perform functions according to the instructions invoked, and include the electronic device (e.g., the electronic device 301, the first electronic device 10, the second electronic device 30, the electronic device 3000, or the electronic device 401) according to embodiments disclosed. If the instructions are executed by a processor (e.g., the processor 320, the processor 31, or the processor 410), the processor may execute functions corresponding to the instructions directly or using other components under the control of the processor. The instructions may include a code generated or executed by a compiler or an interpreter. The machine-readable storage medium may be provided in the form of a non-transitory storage medium. Wherein, the term "non-transitory" simply means that the storage medium does not include a signal and is tangible, but does not differentiate between semi-permanently storing the data in the storage medium and temporarily storing the data in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). If distributed online, at least part of the computer program product may be temporarily generated or at least temporarily stored in the storage medium, such as memory of the manufacturer's server, a server of the application store, or a relay server.

According to various embodiments, each component (e.g., a module or a program) may include a single entity or multiple entities, and part of the above-described components may be omitted, or other components may be added. Alternatively or additionally, the part of components (e.g., modules or programs) may be integrated into a single component, and may still perform a function of each component in the same or similar manner as they are performed by each component before the integration. According to various embodiments, operations performed by the module, the program, or another component may be carried out sequentially, in parallel, repeatedly, or heuristically, or at least part operation may be executed in a different order or omitted, or other operations may be added.

What is claimed is:

1. An electronic device, comprising:
a wireless communication circuit configured to provide wireless communication by using an LPWAN (low power wide area network);
a positioning circuit configured to detect a position of the electronic device;
a processor electrically connected with the wireless communication circuit and the positioning circuit; and
a memory electrically connected with the processor,
wherein the memory stores instructions that, when being executed, cause the processor to:
receive information regarding a plurality of geofences from an external server through the wireless communication circuit,
determine whether the detected position of the electronic device exists within two or more geofences from among the plurality of geofences,
select a geofence of the two or more geofences based on at least part of the information regarding the plurality of geofences, and
transmit a message comprising the detected position of the electronic device and the selected geofence to the external server through the wireless communication circuit, wherein the instructions are executable to cause the processor to:
determine whether the detected position of the electronic device exists within a first geofence from among the plurality of geofences at a first time,
determine whether the detected position of the electronic device exists within the first geofence and a second geofence from among the plurality of geofences at a second time after the first time, and
select the second geofence as the selected geofence, and
wherein the first geofence corresponds to a danger area and the second geofence corresponds to a non-danger area.

2. The electronic device of claim 1, wherein the information regarding the plurality of geofences comprises priorities of the two or more geofences.

3. The electronic device of claim 1, wherein the instructions are executable to cause the processor to:
receive information regarding a third geofence from among the plurality of geofences from the external server,
receive information regarding a fourth geofence from among the plurality of geofences from the external server after receiving the information regarding the third geofence,
determine whether the detected position of the electronic device exists within the third geofence, the fourth geofence and a fifth geofence from among the plurality of geofences at a third time,
determine whether the detected position of the electronic device exists within the third geofence and the fourth geofence, rather than within the fifth geofence, at a fourth time after the third time, and select the third geofence as the selected geofence regarding the fourth time.

4. The electronic device of claim 1, wherein the instructions are executable to cause the processor to:

determine whether the detected position of the electronic device is in the danger area or a periphery of the danger area, provide an alarm according to a result of the determining whether the detected position of the electronic device is in the danger area or the periphery of the danger area, and when the detected position of the electronic device exists within two or more geofences from among the plurality of geofences, determine whether the detected position of the electronic device is in the danger area with reference to the selected geofence.

5. The electronic device of claim 1, wherein the instructions are executable to cause the processor to:

change a position measurement interval according to a result of determining whether the detected position of the electronic device is in the danger area or change the position measurement interval according to a shortest distance between the detected position of the electronic device and a boundary of a geofence from among the plurality of geofences, and when the detected position of the electronic device exists within two or more geofences from among the plurality of geofences, determine whether the detected position of the electronic device is in the danger area with reference to the selected geofence.

6. The electronic device of claim 1, wherein the positioning circuit comprise a global positioning system (GPS).

7. A geofence management method of an electronic device, the method comprising:

receiving information regarding a plurality of geofences from an external server through a wireless communication circuit which provides wireless communication by using an LPWAN (low power wide area network);

detecting a position of the electronic device;

when the detected position of the electronic device exists within two or more geofences from among the plurality of geofences, selecting a geofence of the two or more geofences based on at least part of the information regarding the plurality of geofences; and transmitting a message comprising the detected position of the electronic device and the selected geofence to the external server through the wireless communication circuit, wherein selecting the geofence comprises:

when the detected position of the electronic device exists within a first geofence from among the plurality of geofences at a first time and the detected position of the electronic device exists within the first geofence and a second geofence from among the plurality of geofences at a second time after the first time, selecting the second geofence as the selected geofence, and wherein the first geofence corresponds to a danger area and the second geofence corresponds to a non-danger area.

8. The method of claim 7, wherein the information regarding the plurality of geofences comprises priorities of the two or more geofences.

9. The method of claim 7, further comprising:

determining whether the detected position of the electronic device is in the danger area or a periphery of the danger area; and providing an alarm according to a result of the determining whether the detected position of the electronic device is in the danger area or the periphery of the danger area, and wherein determining whether the detected position of the electronic device is in the danger area or the periphery of the danger area comprises;

when the detected position of the electronic device exists within two or more geofences from among the plurality of geofences, determining whether the detected position of the electronic device is in the danger area with reference to the selected geofence.

10. The method of claim 7, further comprising at least one of:

changing a position measurement interval according to a result of determining whether the detected position of the electronic device is in the danger area; or changing the position measurement interval according to a shortest distance between the detected position of the electronic device and a boundary of a geofence from among the plurality of geofences, and wherein determining whether the detected position of the electronic device is in the danger area comprises:

when the detected position of the electronic device exists within two or more geofences from among the plurality of geofences, determining whether the detected position of the electronic device is in the danger area with reference to the selected geofence.

11. The method of claim 7, wherein detecting the position of the electronic device comprises:

detecting the position of the electronic device through a GPS performed at measurement intervals.

12. The method of claim 7, wherein selecting the geofence comprises:

receiving information regarding a third geofence from among the plurality of geofences from the external server;

receiving information regarding a fourth geofence from among the plurality of geofences from the external server after receiving the information regarding the third geofence; and when the detected position of the electronic device exists within the third geofence, the fourth geofence and a fifth geofence from among the plurality of geofences at a third time and the detected position of the electronic device exists within the third geofence and the fourth geofence, rather than within the fifth geofence, at a fourth time after the third time, selecting the third geofence as the selected geofence regarding the fourth time.

* * * * *